(12) United States Patent
Onuma

(10) Patent No.: US 7,849,954 B2
(45) Date of Patent: Dec. 14, 2010

(54) STEERING SYSTEM FOR VEHICLE

(75) Inventor: Yutaka Onuma, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 266 days.

(21) Appl. No.: 12/281,881

(22) PCT Filed: Feb. 20, 2007

(86) PCT No.: PCT/JP2007/053046

§ 371 (c)(1),
(2), (4) Date: Sep. 5, 2008

(87) PCT Pub. No.: WO2007/102307

PCT Pub. Date: Sep. 13, 2007

(65) Prior Publication Data

US 2009/0050397 A1 Feb. 26, 2009

(30) Foreign Application Priority Data

Mar. 9, 2006 (JP) ............................. 2006-064655

(51) Int. Cl.
*B62D 5/04* (2006.01)
(52) U.S. Cl. ...................... 180/402; 180/444; 180/446; 701/41; 701/42
(58) Field of Classification Search ................. 180/402, 180/444, 446; 701/41, 42
See application file for complete search history.

(56) References Cited

U.S. PATENT DOCUMENTS

| | | | | |
|---|---|---|---|---|
| 5,845,735 | A * | 12/1998 | Muller et al. ............... | 180/322 |
| 6,634,454 | B2 * | 10/2003 | Sugitani et al. ............. | 180/402 |
| 6,827,174 | B2 * | 12/2004 | Chernoff et al. ............ | 180/333 |
| 6,840,346 | B2 * | 1/2005 | Sugitani et al. ............. | 180/402 |
| 6,880,855 | B2 * | 4/2005 | Chernoff et al. ............ | 280/778 |
| 6,929,085 | B2 * | 8/2005 | Sugitani ...................... | 180/402 |
| 6,966,397 | B2 * | 11/2005 | Yanaka ........................ | 180/315 |
| 7,178,613 | B2 * | 2/2007 | Yanaka et al. ............... | 180/6.32 |
| 2002/0053849 | A1 | 5/2002 | Corcoran | |
| 2004/0003954 | A1 * | 1/2004 | Sugitani et al. ............. | 180/402 |
| 2004/0256171 | A1 * | 12/2004 | Sugitani ...................... | 180/402 |
| 2009/0050397 | A1 * | 2/2009 | Onuma ........................ | 180/402 |

FOREIGN PATENT DOCUMENTS

FR 2 706 141 12/1994

(Continued)

*Primary Examiner*—Kevin Hurley
*Assistant Examiner*—Michael R Stabley
(74) *Attorney, Agent, or Firm*—Oblon, Spivak, McClelland, Maier & Neustadt, L.L.P.

(57) ABSTRACT

A steering system including a pair of operating members operable independently of each other, wherein a target wheel-turning amount and a return force for returning operating members to their reference position are determined based on an operation amount of the operating members. At least either a steering gain, set for each pair of operating members upon determination of the target wheel-turning amount, or a return-force gain, set for each pair of operating members upon determination of the return force, is made changeable depending on various parameters. Steering characteristics can be set relatively freely. For example, where the steering gain is made changeable depending on an operating angle of the operating member, determination of the target wheel-turning amount can be made with a changeable degree of contribution of operation of each operating member, which is changeable depending on an operating position of the operating member.

30 Claims, 22 Drawing Sheets

FOREIGN PATENT DOCUMENTS

| | | |
|---|---|---|
| JP | 6-1255 | 1/1994 |
| JP | 9 301193 | 11/1997 |
| JP | 11-192960 | 7/1999 |
| JP | 2000-177616 | 6/2000 |
| JP | 2000 313350 | 11/2000 |
| JP | 2002 161761 | 6/2002 |
| JP | 2002 370656 | 12/2002 |
| JP | 2003-202926 | 7/2003 |
| JP | 2003-312465 | 11/2003 |
| JP | 2004 244022 | 9/2004 |
| JP | 2004244022 A * | 9/2004 |
| JP | 2005 8007 | 1/2005 |
| JP | 2005 225279 | 8/2005 |
| JP | 2006-160123 | 6/2006 |
| JP | 2007-45413 | 2/2007 |

\* cited by examiner (a)

(b)

(a)

(b)

(a)

(b)

(a)

(b)

STEERING SYSTEM FOR VEHICLE

TECHNICAL FIELD

The present invention relates in general to a steering system that is to be installed on a vehicle, and more particularly to such a system having a pair of operating members operable independently of each other and configured to turn a wheel of the vehicle in response to operation of the operating members.

BACKGROUND ART

In these days, as a steering system installed on a vehicle, there is studied a steering system of steer-by-wire type, i.e., a system configured to turn a wheel of the vehicle in response to operation performed on an operating member by a driver of the vehicle, by electrically controlling a drive source provided in a wheel turning device, in response to the operation, without depending on an operating force applied by the vehicle driver. In this system, an operation input device is not required to transmit an operating force applied to the operating member, to the wheel turning device. In other words, since there is no constructional limitation such as mechanical connection between the operating member and the wheel turning device, the system is capable of employing a wide variety of arrangements. As an example of the system, each of Patent Documents 1 and 2 identified below discloses a system of so-called independent operation type, i.e., a system having a pair of operating members that are operable independently of each other.

[Patent Document 1] JP-2004-244022A
[Patent Document 2] JP-H09-301193A

DISCLOSURE OF THE INVENTION (A) Outline of the Invention

The system disclosed in the above-identified Patent Document 1 is a system in which, upon determination of a target wheel-turning amount based on a sum of amounts of operations of the respective operating member, gains that are to be multiplied to the respective amount of the operations are made different from each other. A larger one of the gains is set for one of the operating members that is operated as a main operating member, while a smaller one of the gains is set for the other of the operating members that is operated as an auxiliary operating member to perform auxiliary operations such as a fine adjustment. Thus, the steering system of independent operation type is a unique system, and has an advantage of high degree of freedom upon setting of, for example, steering characteristics such as characteristics of each of the pair of operating members and characteristics of wheel turning in response to operation performed on each of the operating members. However, since the independent operation type steering system is still in a developing stage, there is still room for improvement for increasing the practicability. The present invention was made in the light of the background art discussed above, and has an object of the invention to provide an independent operation type steering system having a high practicability.

For achieving the above object, the steering system of the present invention has a pair of operating members operable independently of each other, wherein a target wheel-turning amount and a return force returning each of the pair of operating members to a reference position are determined based on an amount of operation of each of the pair of operating members. The steering system is characterized in that it is arranged to be possible to change at least one of a steering gain that is set for each of the pair of operating members upon determination of the target wheel-turning amount and a return-force gain that is set for each of the pair of operating members upon determination of the return force.

According to the steering system of the present invention, since it is possible to change at least one of the steering gain and the return-force gain, depending upon, for example, various parameters, steering characteristics of the system can be set relatively freely. Having such an advantage, the steering system of the present invention is a system having a high practicability.

(B) Modes of the Claimable Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. It is noted that below-described modes (1) through (24) correspond to claims 1 through 24, respectively.

(1) A steering system for a vehicle, including:
a pair of operating members operable independently of each other so as to be movable along given orbits, respectively;
a wheel turning device configured to turn a wheel of the vehicle;
a pair of return-force applying devices each having a power source that is controllable to apply, to a corresponding one of the pair of operating members, a return force as a force for returning the corresponding one of the pair of operating members to a return-force reference operating position that is set for the corresponding one of the pair of operating members;
a controlling device having (a) a wheel-turning control portion which is configured to determine a target wheel-turning amount of the wheel based on an amount of operation of each of the pair of operating members from a wheel-turning reference operating position that is set for the each of the pair of operating members and to control the wheel turning device for equalizing a wheel-turning amount of the wheel to the target wheel-turning amount of the wheel, and (b) a return-force control portion which is configured to determine the return force for returning each of the pair operating members, based on an amount of operation of the each of the pair of operating members from the return-force reference operating position that is set for the each of the pair of operating members and to control the power source of each of the pair of return-force applying devices for causing the power source so as to exhibit the return force;
wherein the controlling device is capable of changing at least one of (A) a steering gain that is set for each of the pair of operating members upon determination of the target wheel-turning amount and (B) a return-force gain that is set for each of the pair of operating members upon determination of the return force based on the amount of operation of the each of the pair of operating members.

In the present mode, at least one of the steering gain and the return-force gain is changeable depending on at least one parameter, as described later, such as an operating position of each of the pair of operating members, an operation velocity of each of the pair of operating members, a running speed of the vehicle, and whether the operation is performed by a single hand or both hands. Therefore, according to the steering system of the present invention, steering characteristics of the system can be set relatively freely. For example, it is possible to improve also operability of the system, where the gains are changeable by taking account of ergonomic characteristics of a driver of the vehicle in operation of the operating members, as described later in detail. In the present mode, either both or only one of the steering gain and the return-force gain may be changeable. For example, where the steering gain is changeable, it is possible to change responsiveness and sensitiveness of the wheel turning in response to the operation, since the wheel turning amount based on the operation amount of each of the operating members is changed. Further, where the return-force gain is changeable, it is possible to change easiness of the operation, particularly, easiness of the operation of each of the operating members in a direction away from the reference operating position, i.e., in a direction that increases the operation amount of each of the operating members.

As the pair of operating members in the present mode, it is possible to employ any members respectively operable by right and left hands and having shapes and constructions which are not particularly limited. Described specifically, each of the operating members may have a shape like a so-called handle operable to be moved along an orbit that is straight or curved (e.g., arcuate), or may have a shape like a so-called joystick or lever tiltable in a lateral or longitudinal direction of the vehicle to be moved along an arcuate orbit. It is noted that the steering system of the present mode is not limited to a system in which the pair of operating members are necessarily operated by right and left hands of the vehicle driver, respectively. However, the following descriptions will be made mainly on such a system, for easier understanding of the descriptions.

The construction of the wheel turning device in the present mode is not particularly limited, either. As the wheel turning device, it is possible to employ any devices that are already studied. For example, the wheel turning device may be provided by a device that includes an electric motor and a steering rod such that the steering rod connected to the wheel is laterally moved by a drive force of the electric motor employed as a drive source. In this case, as a mechanism for moving the steering rod, it is possible to employ, for example, a rack-and-pinion mechanism and a ball screw mechanism.

In the system of the present mode equipped with the return-force applying devices, it is possible to apply a reaction force against the operation of each of the operating members in a direction away from the reference operating position, i.e., in a direction that increases the operation amount of each of the operating members, thereby making it possible to provide the vehicle driver with a suitable steering operation feeling. Further, where the return force is controlled to be increased as the operation amount is increased, the reaction force against the operation is increased as each operating member is operated, thereby making it possible to provide the vehicle driver with an operation feeling similar to that provided in a conventional steering system in which the operating member and the wheel turning device are mechanically connected to each other. As a power source of each of the return-force applying devices, it is possible to employ any one of various power sources. However, where an electric motor is employed as the power source, for example, the return force can be easily controlled since a power of the electric motor is easy to be controlled. It is noted that the system of the present mode may be provided with, in addition to the return-force applying devices, devices for applying spring forces for returning the respective operating members to the respective reference positions.

As the controlling device in the present mode, it is possible to employ, for example, an electronic control unit which is constituted principally by a computer and which includes, as needed, drive circuits for the drive source and the power source. As the wheel-turning control portion of the controlling device, it is possible to employ, for example, an arrangement for determining the target wheel-turning amount based on a sum of a turning-amount component based on an operation amount of the right-side operating member from the corresponding wheel-turning reference operating position and another turning-amount component based on an operation amount of the left-side operating member from the corresponding wheel-turning reference operating position. Further, it is also possible to determine the target wheel-turning amount with the turning-amount components of the respective operating members being multiplied by respective weighting coefficients. Still further, as the wheel-turning control portion, it is possible to employ, for example, an arrangement in which the turning-amount component is determined by multiplying the operation amount by the steering gain that is determined by multiplying a reference gain by a coefficient or coefficients compensating the reference gain. Meanwhile, as the return-force control portion, it is possible to employ, for example, an arrangement in which the return force is determined by multiplying the operation amount (of the corresponding operating member from the return-force reference operating position) by the return-force gain that is determined by multiplying a reference gain by a reference or references compensating the reference gain.

The return-force reference operating position and the wheel-turning reference operating position, which are described in the present mode, may be set either in the same position or respective different positions on the orbit. In the system of independent operation type, the return-force reference operating position and the wheel-turning reference operating position can be set in respective different positions, by setting the wheel-turning reference operating position of each of the operating members such that, when the pair of operating members are positioned in the respective return-force reference operating positions, a sum of the turning-amount components (value of each of which is not zero) for the respective operating members becomes zero whereby the wheel is placed into a position (hereinafter referred to as "neutral turning position" or simply "neutral position" where appropriate) that causes the vehicle to run straight. Further, the return-force reference operating position and the wheel-turning reference operating position can be set in a position (hereinafter referred to as "neutral operating position" or simply "neutral position" where appropriate) in which the corresponding operating member is positioned while no force is being applied to the operating member from the return-force applying device or from outside the system.

It is noted that the steering system may be constructed to have, for example, a device arranged to apply a spring force as the return force for returning each operating member to the reference position, without provision of the pair of return-force applying devices and the return-force control portion of the controlling device, so that only the steering gain is changeable. This construction also can constitute a mode of the claimable invention, although not being encompassed by the present mode. Further, there is another construction in which only the return-force gain is changeable and which can constitute a mode of the claimable invention, too.

(2) The steering system according to mode (1), wherein the wheel-turning reference operating position and the return-force reference operating position of each of the pair of operating members are set in the same operating position.

The present mode is a mode in which the wheel-turning reference operating position and the return-force reference operating position are set in the same position located on the corresponding orbit, and has an advantage simplifying the construction of the system.

(3) The steering system according to mode (1) or (2), wherein the controlling device is configured to change at least one of the steering gain and the return-force gain that are set for each of the pair of operating members, depending on an operating position of the each of the pair of operating members.

The present mode is a mode in which the position of each operating member on the orbit is employed as a parameter for changing the gain. In the present mode, the steering gain and the return-force gain, which are respectively set upon determinations of the target wheel-turning amount and the return force, can be arranged to change the target wheel-turning amount and the return force, irrespective of changes of the target wheel-turning amount and the return force based on the operation amount of each of the operating members. In other words, it is possible to change a ratio of change of each of the target wheel-turning amount and the return force in relation to the operation amount. Further, the present mode may be constructed such that, where reference gains are set upon determination of the target wheel-turning amount and return force based on the operation amount of each of the pair of operating members, the target wheel-turning amount and the return force are changed from the respective reference gains while the operating member is being positioned in at least a region as a part of the orbit, or such that the target wheel-turning amount and the return force are changed from the respective reference gains irrespective of which part of the orbit the operating member is being positioned in. It is noted that each of the steering gain and the return-force gain may be changed in steps to be set to one of discrete values, or may be changed without step to be set to one of consecutive values.

(4) The steering system according to mode (3), wherein the at least one of the steering gain and the return-force gain that are set for each of the pair of operating members is changed depending on whether the each of the pair of operating members is positioned in one side region or another side region of a corresponding one of the given orbits, which are close to one and the other of opposite ends of the corresponding orbit, respectively, so that a value of each of the at least one of the steering gain and the return-force gain upon positioning of each of the operating members in the one side region of the corresponding orbit is different from a value of the each of the at least one of the steering gain and the return-force gain upon positioning of the each of the operating members in the other side region of the corresponding orbit.

(5) The steering system according to mode (4), wherein the controlling device is capable of changing at least the steering gain that is set for each of the pair of operating members, and wherein the value of the steering gain upon positioning of the each of the operating members in the one side region of a corresponding one of the given orbits is smaller than the value of the steering gain upon positioning of the each of the operating members in the other side region of the corresponding orbit.

(6) The steering system according to mode (4) or (5), wherein the controlling device is capable of changing at least the steering gain that is set for each of the pair of operating members, and wherein the steering gain is reduced as the operating position of the each of the pair of operating members becomes closer to the one of the opposite ends of a corresponding one of the given orbits, and is increased as the operating position of each of the pair of operating members becomes closer to the other of the opposite ends of the corresponding orbit.

(7) The steering system according to any one of modes (4)-(6), wherein the controlling device is capable of changing at least the return-force gain that is set for each of the pair of operating members, and wherein the value of the return-force gain upon positioning of the each of the operating members in the one side region of a corresponding one of the given orbits is larger than the value of the return-force gain upon positioning of the each of the operating members in the other side region of the corresponding orbit.

(8) The steering system according to any one of modes (4)-(7), wherein the controlling device is capable of changing at least the return-force gain that is set for each of the pair of operating members, and wherein the return-force gain is increased as the operating position of the each of the pair of operating members becomes closer to the one of the opposite ends of a corresponding one of the given orbits, and is reduced as the operating position of each of the pair of operating members becomes closer to the other of the opposite ends of the corresponding region.

Each of the above-described five modes is a mode in which the orbit includes two regions such that the gain set for each of the operating members varies depending on which one of the two regions of the orbit the operating member is being positioned in. For example, where the steering gain is made to vary, a degree of contribution of operation of each operating member to the determination of the target wheel-turning amount is changed depending on a region in which the operating member is being positioned. It is preferable that, when the pair of operating members are both being operated in directions corresponding to turning of the wheels performed in the same direction that causes the vehicle to turn right or left, the degree of contribution of operation of one of the operating members is high if the degree of contribution of operating of the other of the operating members is low. That is, it is preferable that, when one of the operating members is being positioned in the one side region in which the value of the steering gain is small, the other of the operating members is caused to be positioned in the other side region so as to serve as a main operating member. It is preferable that, when the other of the operating members is being positioned in the one side region, the one of the operating members is caused to be positioned in the other side region so as to serve as the main operating member. In the system having such steering characteristics, one and the other of the pair of operating members can be switched depending on the operating position of each operating member, so as to alternately serve as the main operating member.

Where the return-force gain is made to vary depending on which one of the two regions of the orbit the operating member is being positioned in, the operation performed in the one side region (in which the return-force gain is large) requires the operating force larger than the operation performed in the other side region, so that the operation amount in the one side region is made small. Therefore, one of the operating members positioned in the other side region serves as the main operating member, by positioning one of the operating members in the other side region upon positioning of the other of the operating members in the one side region (in which the return-force gain is large) and positioning the one of the operating members in the one side region upon positioning of the other of the operating members in the other side region. That is, in this arrangement varying the return-force gain, as well as the above-described arrangement varying the steering gain, the system can be provided with steering characteristics which permit one and the other of the pair of operating members to be switched depending on the operating position of each operating member, so as to alternately serve as the main operating member.

The one side region and the other side region described in each of the above five modes may be arranged to be contiguous to each other, or arranged to be spaced apart from each other so that there is a region that belongs to neither of the two regions. Further, each of the one and other ends does not necessarily have to be a part of a corresponding one of the one and other side regions. For example, the one side region may be one of two given regions that is close to the one end while the other side region may be the other of the two given regions that is close to the other end. Further, where the two regions are arranged to be contiguous to each other, an entirety of the orbit is sectioned into two regions that are located on respective sides of a boundary such that the one side region is provided by one of the two regions that includes the one end while the other side region is provided by the other of the two regions that includes the other end. In this arrangement, the boundary may be positioned in the above-described wheel-turning reference operating position or return-force reference operating position, so that the one and other side regions are provided on respective opposite sides of one of the two reference operating positions whereby the gain is changed depending upon a direction in which the operating member has been operatively moved.

(9) The steering system according to any one of modes (4)-(8), wherein the one side region is set as a region in which an operation of each of the pair of operating members is difficult to be performed as compared with an operation of the each of the pair of operating members performed in the other side region.

In general, in a steering operation performed by the vehicle driver, there are exist an easy-operation direction and a difficult-operation direction, from an ergonomic point of view, so that the steering operation is easy when being performed in the easy-operation direction and is difficult when being performed in the difficult-operation direction. For example, in a steering operation with a conventional steering wheel, the operation by gripping a lower portion (i.e., a portion close to the vehicle driver) of the steering wheel is difficult to be performed as compared with the operation by gripping an upper portion of the steering wheel. Particularly, when the operation is to be performed in a fine adjustment manner, the operation is likely to be performed by gripping a portion of the steering wheel that is easy to be operated. In the system of independent operation type, since the operating members are not integral with each other unlike the steering wheel, there is a risk that a relatively large difference would be caused between an intention of the vehicle driver and the target wheel-turning amount that is determined based on the operation amount of each of the operating members, due to influence of operation performed in the difficult portion. In the present mode, the above-described difference can be reduced, by reducing the steering gain in the one side region (in which the operation is difficult to be performed) so as to reduce the degree of contribution of the operation to the determination of the target wheel-turning amount, or by increasing the return-force gain in the one side region so as to reduce the above-described difference. That is, the present mode is a mode in which the operating members can to be switched depending on easiness of the operation, so as to alternately serve as the main operating member.

(10) The steering system according to any one of modes (4)-(9), wherein the pair of operating members are a pair of handles which are respectively arranged as a right-side handle and a left-side handle in a lateral direction of the vehicle, and which are operable to be moved along the respective orbits each extending generally in a longitudinal direction of the vehicle, a vertical direction of the vehicle or an inclined direction that is intermediate between the longitudinal and vertical directions, wherein each of an operation of the right-side handle performed in a direction toward a driver of the vehicle and an operation of the left-side handle performed in a direction away from the driver is an operation performed in a right-turn corresponding direction corresponding to turning of the wheel performed in a direction that causes the vehicle to turn right, while each of an operation of the right-side handle performed in a direction away from the driver of the vehicle and an operation of the left-side handle performed in a direction toward the driver is an operation performed in a left-turn corresponding direction corresponding to turning of the wheel performed in a direction that causes the vehicle to turn left, and wherein the operation of each of the handles performed in the direction toward the driver of the vehicle is set as an operation of each of the pair of operating members performed toward the one of the opposite ends, while the operation of each of the handles performed in the direction away from the driver is set as an operation of each of the pair of operating members performed toward the other of the opposite ends.

(11) The steering system according to any one of modes (4)-(9), wherein the pair of operating members are a pair of joysticks which are respectively arranged as a right-side joystick and a left-side joystick in a lateral direction of the vehicle, and which are tiltable generally in the lateral direction so as to be operable to be moved along the respective orbits each arcuate-shaped, wherein each of an operation of the right-side joystick performed in a rightward direction of the vehicle and an operation of the left-side joystick performed in the rightward direction is an operation performed in a right-turn corresponding direction corresponding to turning of the wheel performed in a direction that causes the vehicle to turn right, while each of an operation of the right-side joystick performed in a leftward direction of the vehicle and an operation of the left-side joystick performed in the leftward direction is an operation performed in a left-turn corresponding direction corresponding to turning of the wheel performed in a direction that causes the vehicle to turn left, and wherein an operation of each of the joysticks performed in a direction away from the other of the joysticks is set as an operation of each of the pair of operating members performed toward the one of the opposite ends, while an operation of each of the joysticks performed in a direction toward the other of the joysticks is set as an operation of each of the pair of operating members performed toward the other of the opposite ends.

In each of the above-described two modes, the pair of operating members have a limited construction to which the above-described gain varying mode is effective. From an ergonomic point of view, in the former mode in which the operating members are the handles, the operation performed by each handle is difficult in a position close to the vehicle driver, and, in the latter mode in which the operation members are the joysticks, the operation performed by each joystick is difficult in a position distant from the other joystick. That is, each of the above-described two modes is a mode of the above-described mode in which the one side region is set as a region in which the operation is difficult to be performed.

(12) The steering system according to any one of modes (1)-(11), wherein the controlling device is configured to change at least one of the steering gain and the return-force gain that are set for each of the pair of operating members, depending on an operation velocity of the each of the pair of operating members at which the each of the pair of operating members is operated.

(13) The steering system according to mode (12), wherein the controlling device is capable of changing at least the steering gain that is set for each of the pair of operating members, and wherein the steering gain is made larger when the operation velocity of the each of the pair of operating members is high, than when the operation velocity of the each of the pair of operating members is low.

(14) The steering system according to mode (13), wherein the controlling device is configured to change the steering gain that is set for each of the pair of operating members, depending on the operating position of the each of the pair of operating members, and wherein the steering gain that is set for each of the pair of operating members is changed depending on whether the each of the pair of operating members is positioned in one side region or another side region of a corresponding one of the given orbits, which are close to one and the other of opposite ends of the corresponding orbit, respectively, such that a value of the steering gain upon positioning of each of the operating members in the one side region of the corresponding orbit is smaller than a value of the steering gain upon positioning of the each of the operating members in the other side region of the corresponding orbit, and such that the value of the steering gain upon positioning of each of the operating members in the one side region becomes close to the value of the steering gain upon positioning of the each of the operating members in the other side region when the operation velocity of the each of the pair of operating members is high.

Each of the above-described three modes is a mode in which the operation velocity of each operating member is employed as a parameter for changing the gain. In general, in a case in which the operation is performed at a high operation velocity, for example, in a case as an extreme example in which the operation is abruptly performed for avoiding an emergency situation such as contact of the vehicle, it is preferable that the wheel is turned without delay in response to the rapid operation. For example, when the operation velocity is high, it is possible to avoid delay of the wheel turning, by increasing the steering gain so as to increase the target wheel-turning amount. Particularly, in the above-described mode in which the steering gain is changed depending on the operating position, there is a possibility that the wheel is turned by an insufficiently small amount with delay when the rapid operation is performed in the one side region in which the steering gain is set to be small. In this sense, the mode in which the steering gain is increased upon increase of the operation velocity is an effective mode. Further, in the mode in which the operating members are the handles, since there is a tendency that, from an ergonomic point of view, the abrupt operation is provided principally by operation performed toward the above-described one end, i.e., in a direction toward the vehicle driver, rather than operation performed toward the above-described other end, i.e., in a direction away from the vehicle driver, it is preferable that the steering gain, which is set to be small upon positioning of the operating member in the one side region, is increased when the operation velocity is high. Thus, the above-described mode is effective.

(15) The steering system according to any one of modes (1)-(14), wherein the controlling device is configured to change at least one of the steering gain and the return-force gain that are set for each of the pair of operating members, such that the at least one of the steering gain and the return-force gain that are set for one of the pair of operating members is changed depending on whether the other of the pair of operating members is being operated or not.

The term "operating member is not being operated" does not necessarily mean that the operating member has been returned to a reference operating position, and may be interpreted to mean a case in which the operating member is not being operable immediately by the vehicle driver, specifically described, a case in which the operating member is not being held by the vehicle driver and the operating member is being separated from a hand of the vehicle driver. Further, the above term may be interpreted to include also a case in which the operating member is not moved from a neutral position due to absence of intention of the operation by the vehicle driver although the operating member is being operable by the vehicle driver. The present mode is a mode in which the gain set for one of the pair of operating members is changed depending on whether the other of the pair of operating members is being operated or not. According to the present mode, it is possible to assure a satisfactory steering operating even when the operating is performed by a single hand, as described later in detail.

(16) The steering system according to mode (15), wherein the controlling device is capable of changing at least the steering gain, and wherein the steering gain set for one of the pair of operating members is made larger when the other of the pair of operating members is not being operated, than when the other of the pair of operating members is being operated.

(17) The steering system according to mode (16), wherein the controlling device is configured to change the steering gain that is set for each of the pair of operating members, depending on an operating position of the each of the pair of operating members, wherein the steering gain that is set for each of the pair of operating members is changed depending on whether the each of the pair of operating members is positioned in one side region or another side region of a corresponding one of the given orbits, which are close to one and the other of opposite ends of the corresponding orbit, respectively, such that a value of the steering gain upon positioning of each of the operating members in the one side region of the corresponding orbit is smaller than a value of the steering gain upon positioning of each of the operating members in the other side region of the corresponding orbit, and wherein the value of the steering gain of one of the pair of operating members upon positioning of the one of the operating members in the one side region becomes close to the value of the steering gain of the one of the pair of operating members upon positioning of the one of the operating members in the other side region when the other of the pair of operating members is not being operated.

In the system of independent operation type, there is a case in which the turning amount of the wheel is insufficient when the operation is performed by a single hand, since the target wheel-turning amount is determined based on only the operation amount of a corresponding one of the operating members. Particularly, in the above-described mode in which the steering gain is made to vary depending on the operating position, the wheel turning amount is made considerably small when the operating member operated by a single hand is positioned in the one side region in which the steering gain is set to be small. According to the above-described two modes, the steering gain set for one of the pair of operating members is increased when the other of the pair of operating members is not being operated, so that the wheel turning amount can be increased by increase of the target wheel-turning mount. The insufficiency of the wheel turning amount, which could be caused due to absence of operation of the other of the operating members, can be compensated by changing the steering gain. Thus, even when only one of the operating members is being operated, the wheel can be rolled by a desired amount as if both of the operating members were operated by exactly or almost the same operation amount. That is, when the operation is being performed by a single hand, the wheel can be turned by substantially the same or similar amount as when the operation is being performed by both hands.

(18) The steering system according to any one of modes (15)-(17),
wherein the controlling device is capable of changing at least the return-force gain that is set for each of the pair of operating members,
and wherein the return-force gain set for one of the pair of operating members is made smaller when the other of the pair of operating members is not being operated, than when the other of the pair of operating members is being operated.

(19) The steering system according to mode (18),
wherein the controlling device is configured to change the return-force gain that is set for each of the pair of operating members, depending on an operating position of the each of the pair of operating members,
wherein the return-force gain that is set for each of the pair of operating members is changed depending on whether the each of the pair of operating members is positioned in one side region or another side region of a corresponding one of the given orbits, which are close to one and the other of opposite ends of the corresponding orbit, respectively, such that a value of the return-force gain upon positioning of each of the operating members in the one side region of the corresponding orbit is larger than a value of the return-force gain upon positioning of each of the operating members in the other side region of the corresponding orbit,
and wherein the value of the return-force gain of one of the pair of operating members upon positioning of the one of the operating members in the one side region becomes close to the value of the return-force gain of the one of the pair of operating members upon positioning of the one of the operating members in the other side region when the other of the pair of operating members is not being operated.

In the above-described two modes, the return-force gain set for one of the operating members is changed depending on whether the other of the operating members is being operated or not. According to each of the two modes, the return-force gain set for one of the operating members is made small when the other of the operating members is not being operated, whereby the return force for the one of the operating members is made small, so that the one of the operating members can be easily operated by a large operation amount by a small operating force. That is, as in the latter of the two modes, it is effective to the above-described mode in which the restore-force gain is changed depending on the operating position, thereby making it possible to change the restore-force gain in such a manner that the operation can be easily performed in the one side region in which the restore-force gain is set to be large.

(20) The steering system according to any one of modes (15)-(17),
wherein the controlling device is capable of changing at least the return-force gain that is set for each of the pair of operating members,
and wherein the return-force gain set for one of the pair of operating members is made larger when the other of the pair of operating members is not being operated, than when the other of the pair of operating members is being operated.

The present mode is a mode contrary to the above-described mode in which the return-force gain set for one of the operating members is made small when the other of the operating members is not being operated. Rather, in the present mode, the return-force gain set for one of the operating members is made large when the other of the operating members is not being operated. In an operating member like a conventional steering wheel, when the operation is performed by a single hand, a reaction force against the operation is received by the single hand rather than by both hands, so that the reaction force acting in the single hand is made larger. That is, according to the present mode, when the other of the operating members is not being operated, the return-force gain set for one of the operating members is increased whereby the return force is increased, so that the vehicle driver can be provided with an operation feeling similar to that provided by a conventional operating member. It is noted that the present mode can be carried out together with the above-described mode in which the steering gain set for one of the operating members is increased when the other of the operating members is not being operated so that substantially the same wheel turning amount can be obtained by either a single hand or both hands. Thus, during operation with a single hand, it is possible to realize a steering operation more similar to that realized in a conventional steering system.

(21) The steering system according to any one of modes (15)-(20),
wherein the wheel-turning reference operating position and the return-force reference operating position of each of the pair of operating members are set in the same operating position as a reference operating position,
the steering system being configured to determine that the other of the pair of operating members is not being operated, when only the one of the pair of operating members is operated to be moved from a state in which both of the pair of operating members are positioned in the reference operating positions that are respectively set for the pair of operating members.

The present mode is a mode in which it is determined in a particular case or cases that the operation is performed by a single hand. According to the present mode, it is not necessary to provide a sensor or the like, which exclusively serves to detect a state of non-operation of each operating member, for example, by determining that each operating member is not touched by the vehicle driver. It is therefore possible to simplify the construction of the steering system.

(22) The steering system according to any one of modes (1)-(21), wherein the controlling device is configured to change at least one of the steering gain and the return-force gain, depending on a running speed of the vehicle.

(23) The steering system according to mode (22), wherein the controlling device is capable of changing at least the steering gain, and wherein the steering gain is made larger when the running speed of the vehicle is low, than when the running sped of the vehicle is high.

(24) The steering system according to mode (22) or (23), wherein the controlling device is capable of changing at least the return-force gain, and wherein the return-force gain is made smaller when the running speed of the vehicle is low, than when the running sped of the vehicle is high.

Each of the above-described three modes is a mode in which the vehicle running speed is employed as a parameter for changing the gain. For example, according to mode (23) in which the steering gain is changed depending on the running speed, the steering gain is increased when the running speed is low, whereby the target wheel-turning amount is increased so that the wheel can be turned by a large amount by a small operation amount. Further, according to mode (24) in which the return-force gain is changed depending on the running speed, the return-force gain is reduced when the running speed is low, whereby the return force is reduced so that it is possible to reduce an operating force required for the operation.

In general, when the vehicle running speed is low, there is a case in which the wheel is to be tuned by a large amount, for example, for performing a so-called steering without driving or U turn. In such a case, for reducing burden imposed to the vehicle driver, it is preferable to cause the wheel to be turned by a relatively large amount by a small operation amount, or to reduce the operating amount required for the operation. On the other hand, when the vehicle running speed is high, a large wheel turning amount could be a factor affecting stability of the running vehicle. It is therefore preferable that, during running of the vehicle at a high speed, the wheel is turned by a relatively small amount even when the operation amount is large, or the operating force required for the operation is made large so that the operation amount is not made large. According to the above-described modes, such a steering operation can be realized.

BEST MODE FOR CARRYING OUT THE INVENTION

There will be described embodiments of the present invention, by reference to the accompanying drawings. It is to be understood that the claimable invention is not limited to the following embodiments, and may be otherwise embodied with various changes and modifications, such as those described in the foregoing "MODES OF THE INVENTION", which may occur to those skilled in the art.

First Embodiment

1. Construction of Steering System

Figure 1:
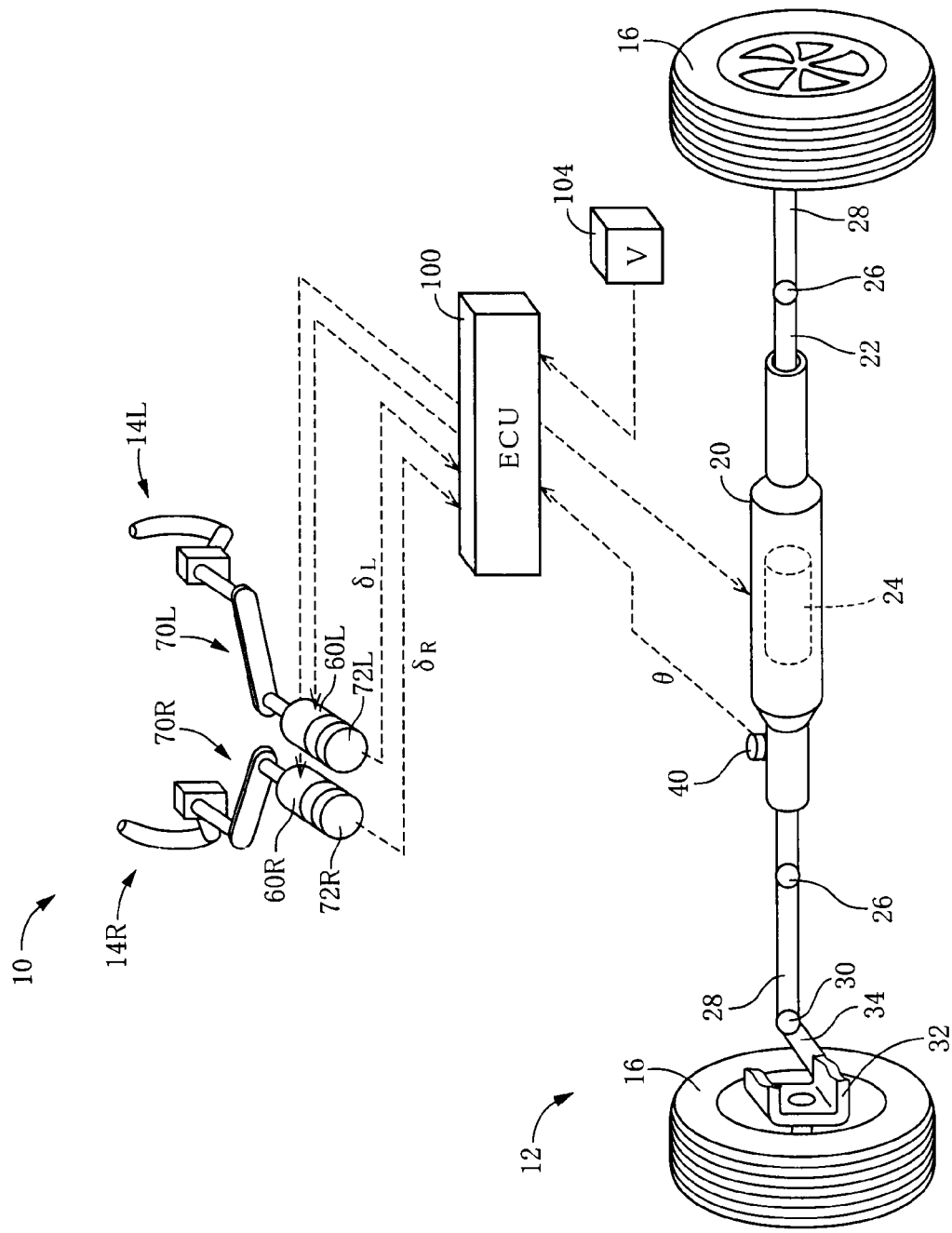
FIG. 1 is a schematic view showing an overall construction of a steering system for a vehicle, which is a first embodiment of the claimable invention.

FIG. 1 schematically shows an overall construction of a steering system that is a first embodiment of claimable invention. This steering system is of a so-called steer-by-wire type, and includes an operating device 10 and a wheel turning device 12 that are mechanically separated from each other, so that wheels 16 are turned by a drive force generated by a drive source provided in the wheel turning device 12 without depending on an operating force applied to each of operating members in the form of a pair of handles 14R, 14L (hereinafter generally referred to as handles 14 where appropriate). Further, the present steering system is of independent operation type in which the pair of handles 14 are operable independently of each other.

The operating device 10 is constructed to include the pair of handles 14, and is fixed to a part of a vehicle body, described in detail, to a reinforcement of an instrument panel. Each of the handles 14 is held by the operating device 10, movably along a generally arcuate-shaped orbit, and is given a force by the operating device 10 such that each handle 14 is forced in a direction of the orbit, as described later in detail.

The wheel turning device 12 is constructed to include a housing 20 and a steering rod 22, such that the housing 20 is fixed to the vehicle body (chassis, described in detail) while the steering rod 22 is disposed in the housing 20 to be movable in its axial direction (i.e., a lateral direction of the vehicle). Although its internal portion is not illustrated in the drawings, the wheel turning device 12 is equipped with a drive source in the form of a wheel turning motor 24 that is disposed coaxially with the steering rod 22. The wheel turning motor 24 is operated to rotate a nut, which is held in thread engagement with a screw that is formed in the steering rod 22, via balls that are interposed between the nut and the screw, so that the steering rod 22 is moved in its axial direction. The steering rod 22 is connected at its opposite ends to respective tie rods 28 via respective ball joints 26. Each of the tie rods 28 is connected at one of its opposite ends to the steering rod 22 via the ball joint 26, and is connected at the other of the opposite ends to a knuckle arm 34 via another kind of ball joint 30. The knuckle arm 34 is a part of a steering knuckle 32 by which the wheel 16 is rotatably held. Owing to such a connection arrangement, the wheels 16 are turned by movement of the steering rod 22 in the axial direction.

The wheel turning device 12 is provided with a wheel-turning amount sensor 40 configured to obtain an amount of turning of the wheels 16. The wheel-turning amount sensor 40 detects an amount of rotation of a pinion gear meshing with a rack gear that is formed in the steering rod 22, described in detail, detects the amount of rotation from a neutral position of the pinion gear that corresponds to its position in state of straight running of the vehicle. That is, the wheel-turning amount sensor 40 is configured to indirectly obtain the turning amount of the wheels 16 that are turned by movement of the steering rod 22 in the axial direction, by obtaining the amount of rotation of the pinion gear that is caused by movement of the steering rod 22 in the axial direction.

Figure 2:
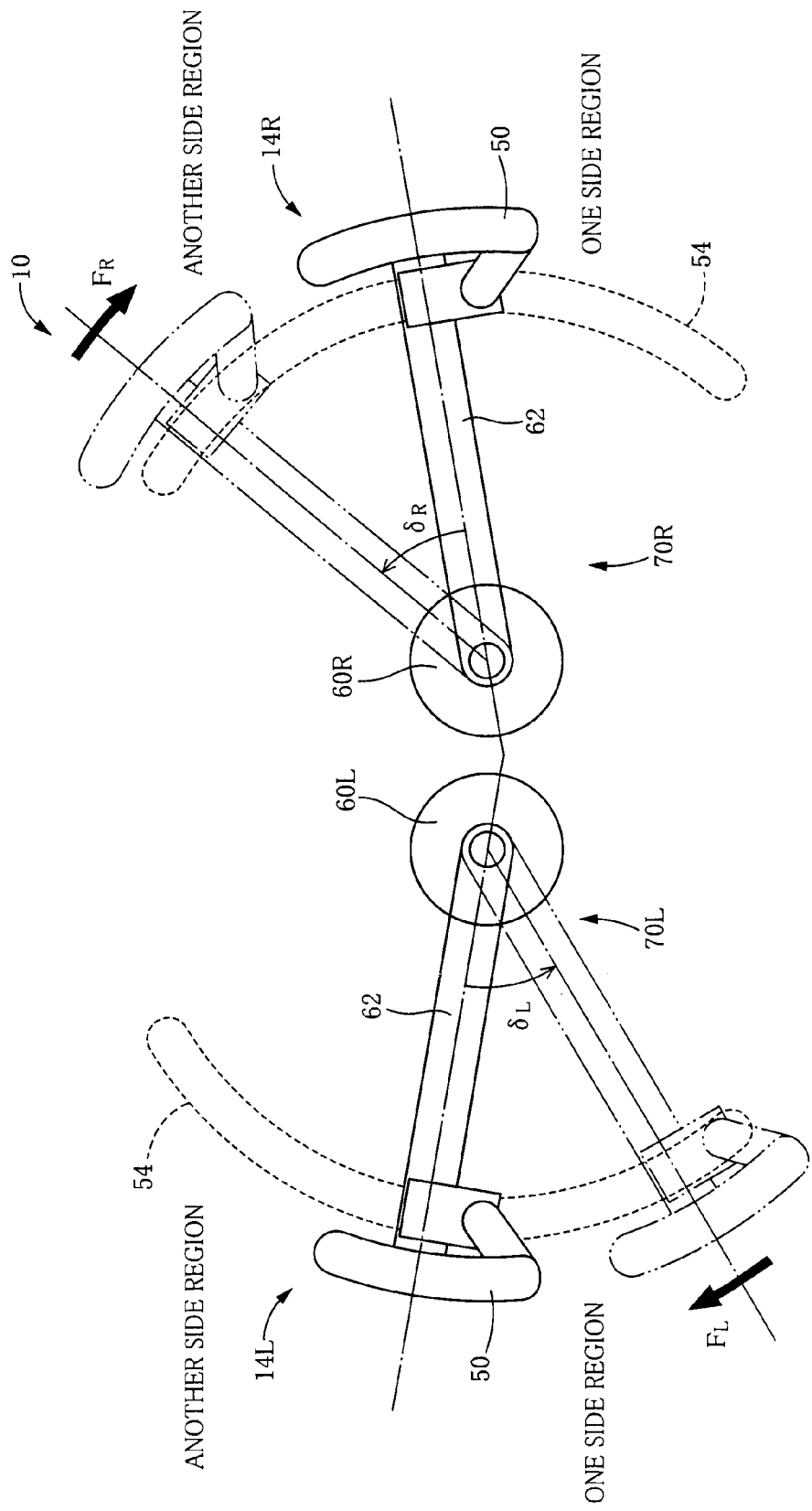
FIG. 2 is a front view (view as seen from side of a vehicle driver) of an operating device included in the steering system of FIG. 1.
Figure 3:
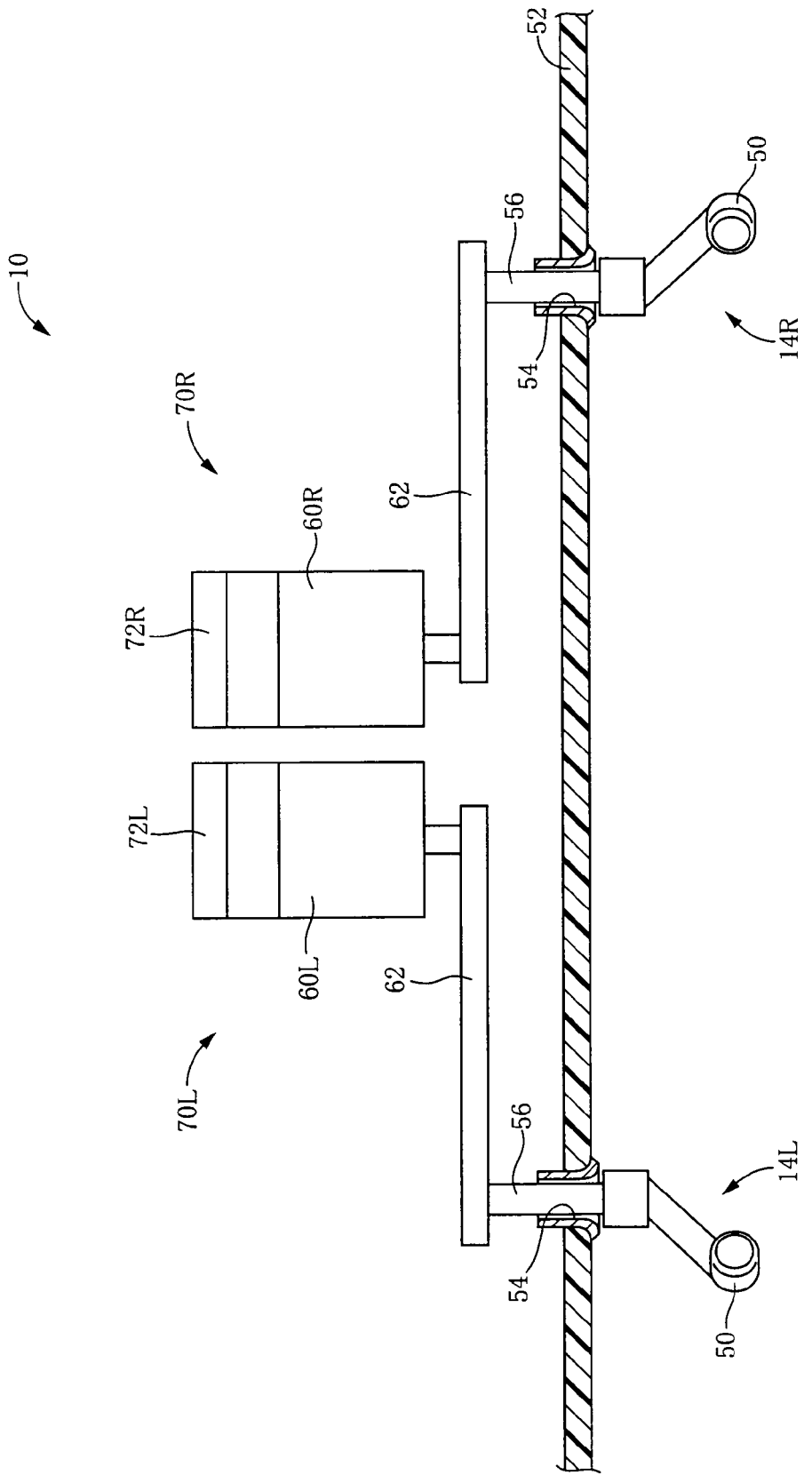
FIG. 3 is a view of the operating device of FIG. 2, as seen from an upper side of the vehicle.
Figure 4:
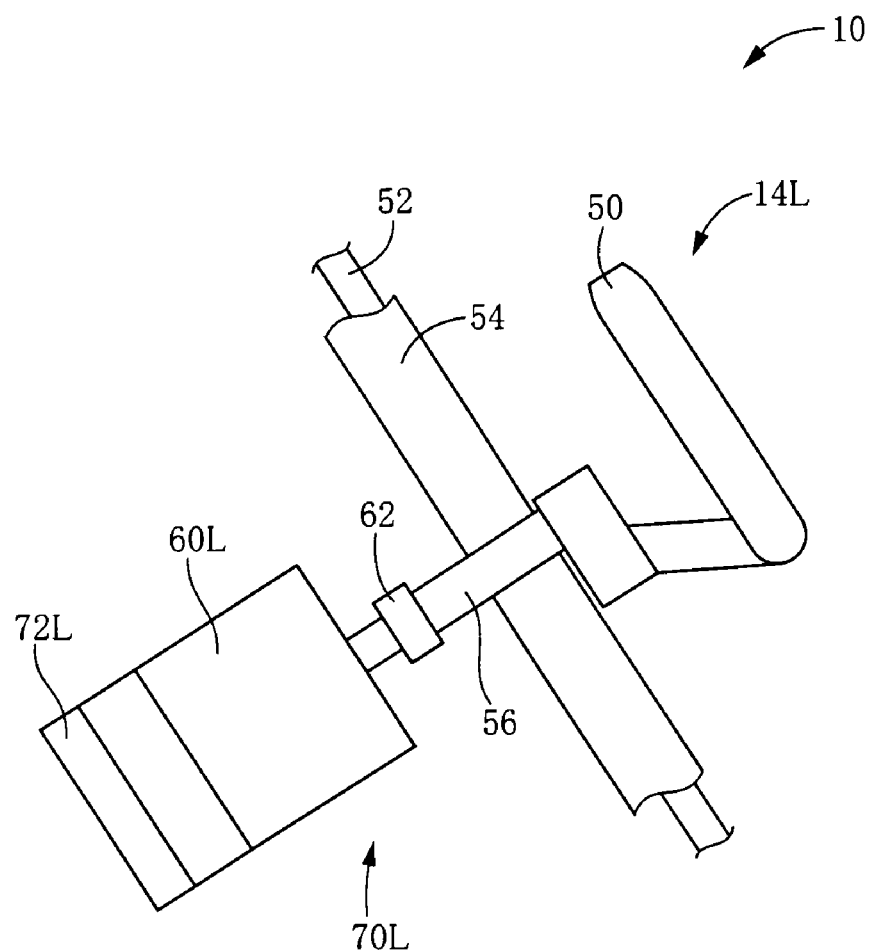
FIG. 4 is a side view of the operating device of FIG. 2, as seen from a left side of the vehicle.

There will be described construction of the operating device 10, by reference also to FIGS. 2-4. FIG. 2 is a front view (view as seen from side of a driver's seat) of the operating device 10. FIG. 3 is a view of the operating device 10, as seen from its upper side. FIG. 4 is a side view of the operating device 10, as seen from a left side of the vehicle.

Each of the pair of handles 14 constituting the operating device 10 is a bar-like member that has a generally L shape as seen from its side. Each handle 14 has a grip portion 50 which is to be gripped by the vehicle driver and which is provided by a portion extending upwardly. The grip portion 50 is inclined such that its lower portion is closer to the vehicle driver as compared with its upper portion. The pair of handles 14 are disposed to be movable along respective slots 54 that are provided in a panel member 52 of an instrument panel. Described in detail, the pair of handles 14 are integral with respective handle rods 56 which pass through the panel member 52 and project from an interior of the instrument panel. The handle rods 56 are movable along the respective slots 54 each formed to have an arcuate shape.

Each of the pair of handles 14 is placed in a state for placing the wheels 16 in a wheel-turning neutral position, when each of the handles 14 is positioned in a reference operating position (i.e., position indicated by solid line in FIG. 2) located on an orbit that is defined by a corresponding one of the slots 54. When either one or both of the pair of handles 14 are operated clockwise from the reference operating position, the vehicle is caused to turn right. When either one or both of the pair of handles 14 are operated counterclockwise from the reference operating position, the vehicle is caused to turn left.

The handle rods 56 integrally provided with the respective handles 14 are connected to respective arms 62, which are rotated by respective electric motors 60 inside the instrument panel. The pair of motors 60 are fixed to an instrument panel reinforcement such that an output shaft of each motor 60 is located at a center of a corresponding one of the arcuate-shaped slots 54. Each of the arms 62 is connected at one of its opposite end portions with the output shaft of a corresponding one of the motors 60. Each of the arms 62 extends along the panel member 52, and is connected at the other of its opposite end portions to a corresponding one of the handle rods 56. Owing to such a construction, the pair of handles 14 are held by a part of the vehicle body. The above-described reference operating position of each of the handles 14 is a position in which a corresponding one of the arms 62 is pivoted slightly upwardly from a position in which the corresponding arm 62 is horizontal. In the following descriptions, one and the other of the motors 60 for the respective right-side and left-side handles 14R and 14L will be referred to as motors 60R, 60L, respectively, where appropriate.

Each of the motors 60 is a motor having a speed reducer built therein, and is capable of applying a return force F as a force for returning the corresponding handle 14 to the reference operating position (see FIG. 2). That is, the present steering system includes a pair of return-force applying devices 70 each of which is provided for the corresponding handle 14 and is constituted by the corresponding motor 60 and arm 62. The motor 60 of each return-force applying device 70 functions as a power source of the device 70. In the present steering system, an amount and a direction of the return force are changeable as desired by controlling the corresponding motor 60. Although the detailed descriptions are not provided herein, the motor 60R is equipped with an operating angle sensor 72R capable of detecting an operating angle $\delta_R$ of the handle 14R as an amount of operation of the handle 14R from its reference operating position, and the motor 60L s equipped with an operating angle sensor 72L capable of detecting an operating angle $\delta_L$ of the handle 14L as an amount of operation of the handle 14L from its reference operating position. Each of the operating angle sensors 72R, 72L is a rotational angle sensor which is constituted principally by a rotary encoder and which is configured to detect a rotational angle of the shaft of the corresponding motor 60.

Thus, each of the operating angle sensors 72R, 72L detects an amount of rotation of the motor shaft from its reference rotational position that is set to correspond to the reference operating position of a corresponding one of the handles 14R, 14L, for thereby detecting a corresponding one of the operating angles $\delta_R$, $\delta_L$. Each of the operating angles $\delta_R$, $\delta_L$ is represented by a positive value when the corresponding handle 14 is pivoted from its reference operating position in counterclockwise direction that is a direction (left-turn corresponding direction) corresponding to wheel turning performed in a direction that causes the vehicle to turn left, and is represented by a negative value when the corresponding handle 14 is pivoted from its reference operating position in clockwise direction that is a direction (right-turn corresponding direction) corresponding to wheel turning performed in a direction that causes the vehicle to turn right, as shown in FIG. 2. Further, the return force F is represented by a positive value when being applied upon pivot movement of the handle 14 in the left-turn corresponding direction (namely, when acting in a direction that causes the handle 14 to be pivoted clockwise), and is represented by a negative value when being applied upon pivot movement of the handle 14 in the right-turn corresponding direction (namely, when acting in a direction that causes the handle 14 to be pivoted counterclockwise). It is noted that, in the present system, the wheel-turning reference operating position and the return-force reference operating position of each of the handles 14 are set in the same operating position.

2. Controls Performed by ECU

The present steering system constructed as described above is controlled by a controlling device in the form of a steering electronic control unit 100 (hereinafter referred to as "ECU 100" where appropriate), which is constituted principally by a computer 102. To the ECU 100, there are connected various sensors such as the above-described wheel-turning amount sensor 40, pair of operating angle sensors 72 and a running speed sensor 104 that is provided to detect a vehicle running speed v (hereinafter abbreviated as "vehicle speed v" where appropriate). Further, the ECU 100 has drive circuits (drivers) for driving the wheel turning motor 24 of the wheel turning device 12 and the motors 60 of the respective return-force applying devices 70 provided in the operating device 10, and is configured to control operations of the motors 24, 60. The computer of the ECU 100 stores therein various data relating to return-force control program, wheel-turning control program and control of the steering system, which will be described later.

The ECU 100 executes mainly two controls, i.e., wheel-turning control and return-force control. The wheel-turning control is a control relating to the wheel turning device 12, described in detail, a control of the wheel turning motor 24. In this wheel-turning control, the operating angles $\delta_R$, $\delta_L$ of the respective handles 14 are obtained based on detection signals supplied from the respective operating angle sensors 72, and a target wheel-turning amount $\theta^*$, i.e., a target value of wheel turning amount corresponding to a rotational position of the pinion gear is determined based on the obtained operating angles $\delta_R$, $\delta_L$ and according to the following expression:

$$\theta^* = G_{SR} \cdot \delta_R + G_{SL} \cdot \delta_L,$$

In this expression, "$G_{SR}$" and "$G_{SL}$" represent steering gains for the respective handles 14, and the steering gains multiplied by the respective angles are turning-amount components for the respective handles 14. Then, the target wheel-turning amount $\theta^*$ is determined as a sum of the turning-amount components. The steering gains $G_{SR}$, $G_{SL}$ are determined based on various parameters, and its detailed description will be provided later. Next, an actual wheel-turning amount $\theta$ is obtained based on a detection signal supplied from the wheel-turning amount sensor 40, and a turning amount deviation $\Delta\theta$ ($=\theta^*-\theta$) of the actual wheel-turning amount $\theta$ from the target wheel-turning amount $\theta^*$ is recognized. Then, an electric current $I_S$ that is to be supplied to the wheel turning motor 24 is determined such that the turning amount deviation $\Delta\theta$ becomes zero. Then, a command relating to the determined electric current $I_S$ is transmitted to an inverter as a drive circuit so that the electric current $I_S$ is supplied by the inverter to the wheel turning motor 24.

The steering gains $G_{SR}$, $G_{SL}$ are changed from a reference gain $K_S$ that is a gain for converting the operating angle into the wheel turning amount. Specifically, each of the steering gains $G_{SR}$, $G_{SL}$ is the reference gain $K_S$ multiplied by a corresponding one of first variables $\alpha_{SR}$, $\alpha_{SL}$ and a second variable $\beta_S$, wherein the first variables $\alpha_{SR}$, $\alpha_{SL}$ are determined based on the respective operating positions of the respective handles 14 while the second variable $\beta_S$ is determined based on the vehicle speed v that is obtained through the running speed sensor 104. That is, the steering gains $G_{SR}$, $G_{SL}$ are expressed by the following expressions:

$$G_{SR} = K_S \cdot \alpha_{SR} \cdot \beta_S$$

$$G_{SL} = K_S \cdot \alpha_{SL} \cdot \beta_S$$

Figure 5:
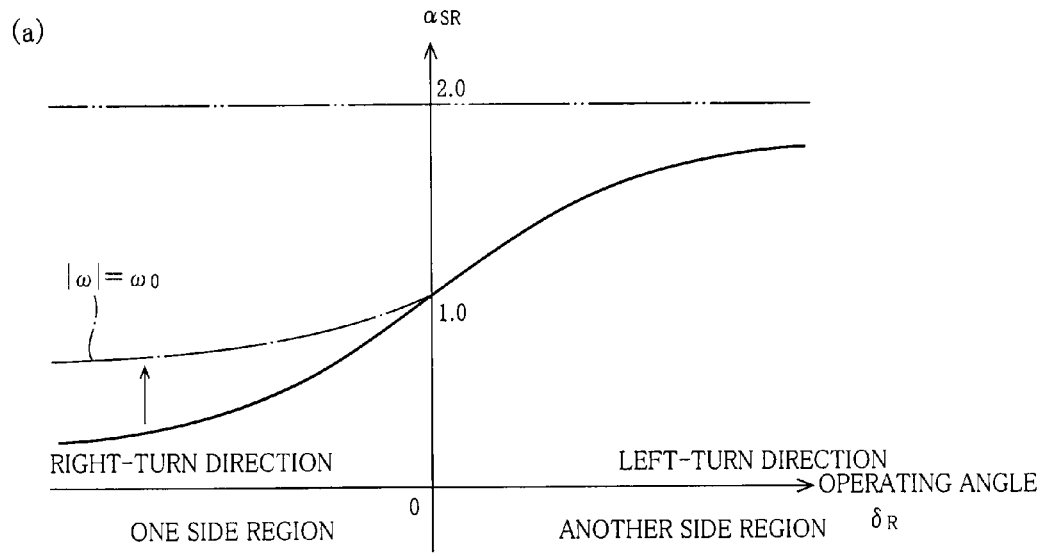
FIG. 5 is a set of views showing a relationship between an operating angle of an operating member and a first variable that is provided for changing a steering gain based on an operating position of the operating member.
Figure 5:
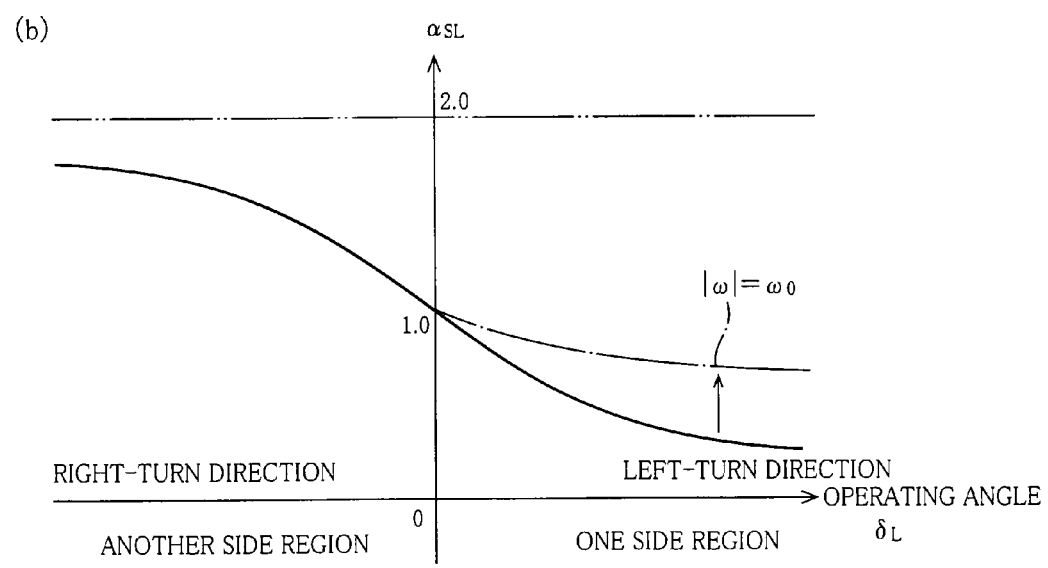

The first variables $\alpha_{SR}$, $\alpha_{SL}$ are determined based on the respective operating positions of the respective handles 14, i.e., the respective operating angles $\delta_R$, $\delta_L$. In each of the handles 14 provided in the present steering system, from an ergonomic point of view, the operation in a region in which the handle 14 has been pivoted from the reference operating position in a direction toward the vehicle driver is difficult to be performed as compared with the operation in a region in which the handle 14 has been pivoted from the reference operating position in a direction away from the vehicle driver. By taking account of this, the orbit of each of the handles 14 is sectioned into two regions, and one of the two regions in which the handle 14 has been pivoted from the reference operating position in the direction toward the vehicle driver is referred to as one side region, while the other of the two regions in which the handle 14 has been pivoted from the reference operating position in the direction away from the vehicle driver is referred to as another side region. The variables $\alpha_{SR}$, $\alpha_{SL}$ are determined such that each of the steering gains $G_{SR}$, $G_{SL}$ is larger when a corresponding one of the handles 14 is positioned in the one side region than when the corresponding handle 14 is positioned in the other side region. Described in detail, as is understood from view shown in FIG. 5 (a), the variable $\alpha_{SR}$ for the right-side handle 14R is increased as the operating angle $\delta_R$ is increased (as the handle 14R is turned left). The variable $\alpha_{SR}$ for the right-side handle 14R is reduced as the operating angle $\delta_R$ is reduced (as the handle 14R is turned right), namely, as an absolute value of the operating angle $\delta_R$ becomes larger when the operating angle $\delta_R$ is represented by a negative value. On the other hand, as is understood from view shown in FIG. 5 (b), the variable $\alpha_{SL}$ for the left-side handle 14L is reduced as the operating angle $\delta_L$ is increased (as the handle 14L is turned left). The variable $\alpha_{SL}$ for the left-side handle 14L is increased as the operating angle $\delta_L$ s reduced (as the handle 14L is turned right), namely, as an absolute value of the operating angle $\delta_L$ becomes larger when the operating angle $\delta_R$ is represented by a negative value.

Figure 6:
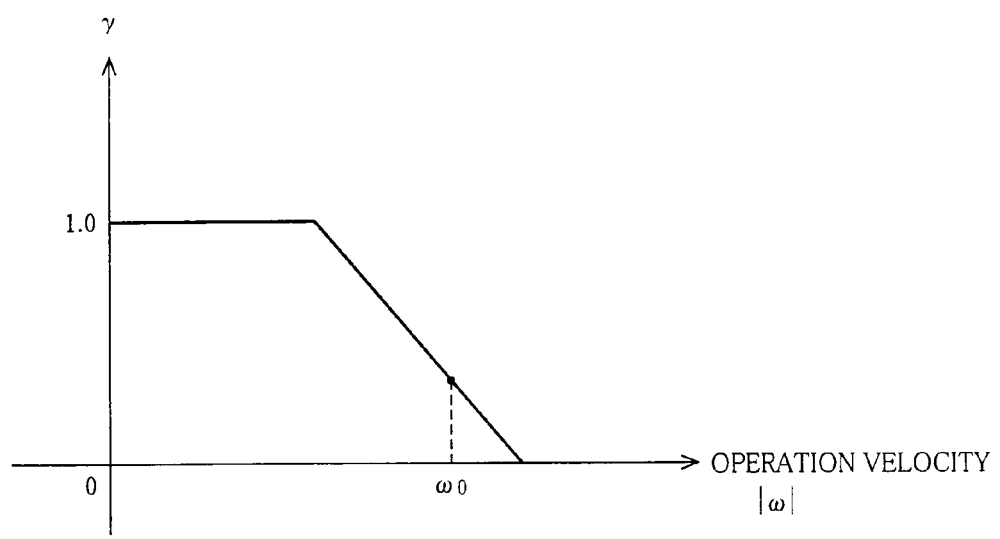
FIG. 6 is a view showing a relationship between an operation velocity of the operating member and a compensating coefficient that is provided for compensating the first variable of FIG. 5.

For example, when the operation is performed abruptly for avoiding contact of the vehicle, there is a tendency that, from an ergonomic point of view, the abrupt operation is principally provided by operation performed in a direction toward the vehicle driver, rather than by operation performed in a direction away from the vehicle driver. In the one side region in which the handle has been pivoted in the direction toward the vehicle driver, there is a possibility that the wheel is turned with delay, since the first variables $\alpha_{SR}$, $\alpha_{SL}$ are made small whereby the steering gains $G_{SR}$, $G_{SL}$ are made small in the one side region. In view of such a possibility, the ECU 100 is configured to change each of the first variables $\alpha_{SR}$, $\alpha_{SL}$ depending on the operation velocity of a corresponding one of the handles 14, for avoiding the delay of the wheel turning. Described in detail, each of the first variables $\alpha_{SR}$, $\alpha_{SL}$ is compensated by using a compensating coefficient $\gamma$ that is determined depending on the operation velocity $\omega$ of a corresponding one of the handles 14. The first variables $\alpha_{SR}$, $\alpha_{SL}$ are calculated according to the following expressions. It is noted that a relationship between the compensating coefficient $\gamma$ and an absolute value $|\omega|$ of the operation velocity is shown in FIG. 6.

$$\alpha_{SR}=1-\gamma\cdot(1-\alpha_{SR})$$

$$\alpha_{SL}=1-\gamma\cdot(1-\alpha_{SL})$$

Thus, each of the first variables $\alpha_{SR}$, $\alpha_{SL}$ is changed when a corresponding one of the handles 14 is pivoted in the direction toward the vehicle driver with the operation velocity being higher than a certain velocity such that each of the first variables $\alpha_{SR}$, $\alpha_{SL}$ is increased as the operation velocity of the corresponding handle 14 is increased. For example, the first variable $\alpha_{SR}$, when the operation velocity of the right-side handle 14R is $\omega_0$, is indicated by chain line in FIG. 5 (a). The first variable $\alpha_{SL}$, when the operation velocity of the left-side handle 14L is $\omega_0$, is indicated by chain line in FIG. 5 (b).

Next, there will be studied a case of operation performed by a single hand. For example, when the handle 14 is operated by a single hand to be pivoted in a direction toward the vehicle driver, the wheel turning amount is made small in the one side region in which the handle 14 has been pivoted in the direction toward the vehicle driver since the first variables $\alpha_{SR}$, $\alpha_{SL}$ are small in the one side region. In view of this, the ECU 100 is configured to change one of the first variables $\alpha_{SR}$, $\alpha_{SL}$ when the other of the pair of handles is not being operated. Described in detail, the first variable $\alpha_S$ for the handle 14 that is being operated is changed to 2.0 (see two-dot chain line in FIG. 5) for causing the wheels to be turned even in operation of a single hand by substantially the same amount as in operation of both hands, while the first variable $\alpha_S$ for the handle 14 that is not being operated is changed to 0. In the present system, it is determined that, when only one of the handles 14 is operated from a state in which both of the handles 14 are positioned in the respective reference operating positions, the other of the handles 14 is not being operated. There is a case in which the operating member that has not been operated starts to be operated after the first variables $\alpha_{SR}$, $\alpha_{SL}$ have been changed due to operation performed by a single hand, and also a case in which the first variables $\alpha_{SR}$, $\alpha_{SL}$ are returned to normal values after the first variables $\alpha_{SR}$, $\alpha_{SL}$ have been changed, based on the operation velocity, to large values larger than the normal values. In these cases, the first variables $\alpha_{SR}$, $\alpha_{SL}$ are gradually changed for avoiding abrupt change of the target wheel-turning amount $\theta^*$.

Figure 7:
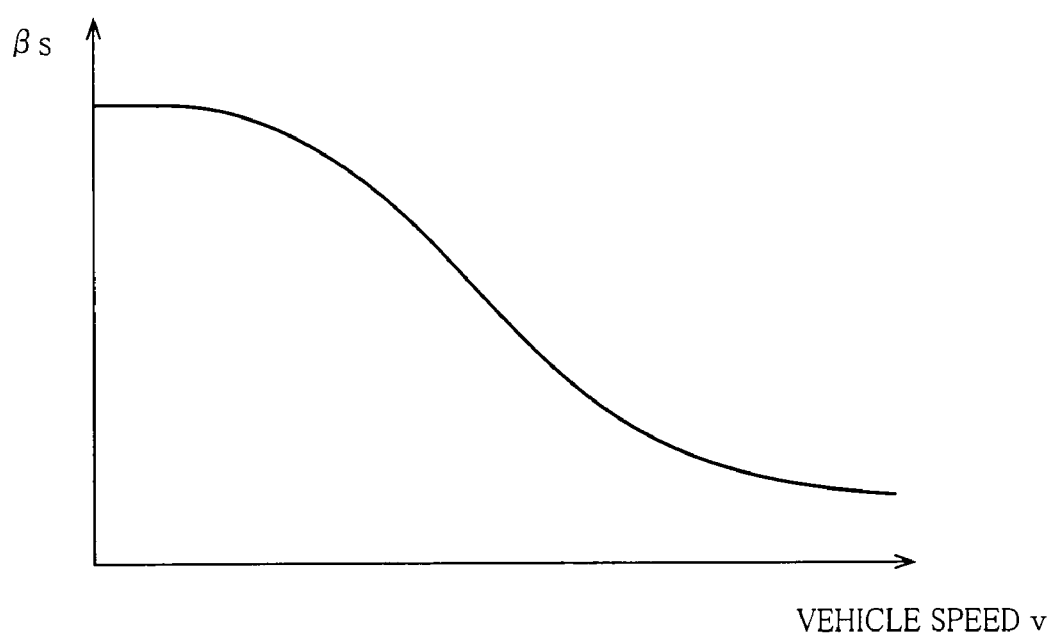
FIG. 7 is a view showing a relationship between a running speed of the vehicle and a second variable that is provided for changing the steering gain based on the vehicle running speed.

As shown in FIG. 7, the second variable $\beta_S$ is set to be reduced as the vehicle speed v is increased. Thus, when the vehicle speed v is high, the steering gains $G_{SR}$, $G_{SL}$ for both of the operating members are reduced whereby the target wheel-turning amount $\theta^*$ is reduced. That is, when the running speed of the vehicle is high, the wheel turning amount of the wheels 16 relative to the operating angles of the pair of handles 14 is reduced so that it is possible to improve stability of operation in the vehicle during running of the vehicle at a high speed. On the other hand, when the running speed of the vehicle is relatively low, the wheel turning amount of the wheel 16 relative to the operating angles of the pair of handles 14 is increased so that it is possible to reduce burden imposed to the vehicle driver.

Figure 8:
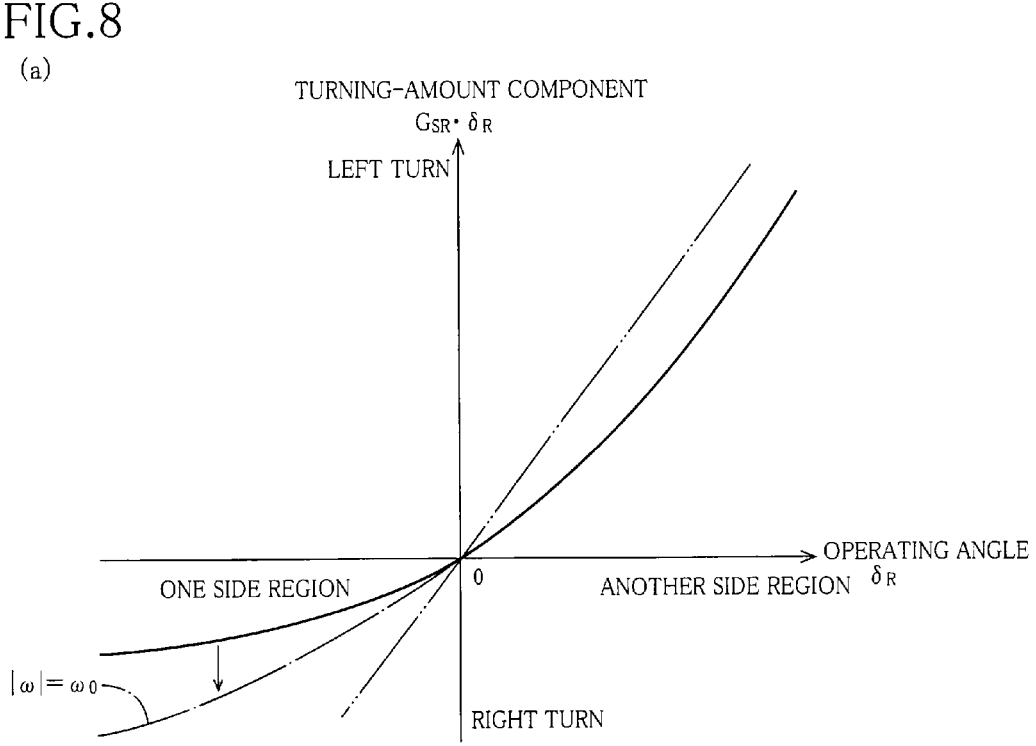
FIG. 8 is a set of views each showing a relationship between the operating angle of the right-side or left-side operating member and a turning-amount component for the right-side or left-side operating member.
Figure 8:
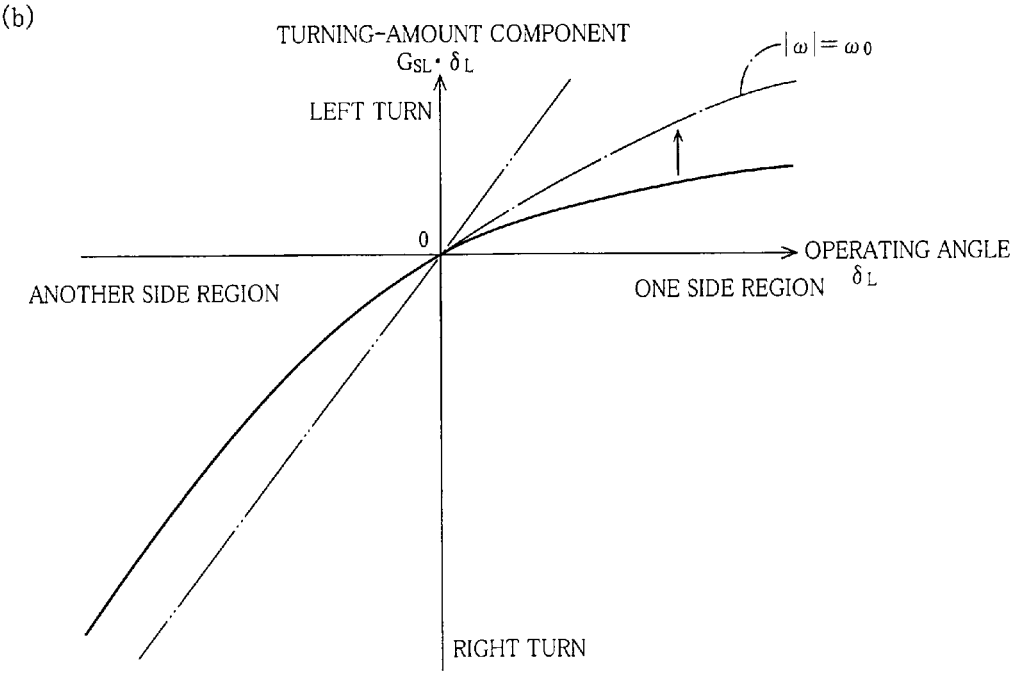

As described above, after the first variables $\alpha_{SR}$, $\alpha_{SL}$ and the second variable $\beta_S$ have been determined, the steering gains $G_{SR}$, $G_{SL}$ for both of the pair of handles 14 are calculated. Then, the turning-amount components for the respective handles 14 are obtained whereby the target wheel-turning amount $\theta^*$ is determined. FIG. 8 is a set of views each showing a relationship between the operating angle of a corresponding one of the pair of handles 14 and the turning-amount component for the corresponding handle 14 during running of the vehicle at a certain speed. As is understood from FIG. 8, in a normal state, when each of the pair of handles 14 is operated in the left-turn corresponding direction, the turning-amount component for the right-side handle 14R is made larger than the turning-amount component for the left-side handle 14L so that the right-side handle 14R serves as a main operating member. When each of the pair of handles 14 is operated in the right-turn corresponding direction, the turning-amount component for the left-side handle 14L is made larger than the turning-amount component for the right-side handle 14R so that the left-side handle 14L serves as the main operating member.

The return-force control, as another one of the two controls executed by the ECU 100, is a control relating to the pair of return-force applying devices 70, described in detail, a control of the pair of motors 60. As a part of this control that is executed for the right-side handle 14R, the operating angle $\delta_R$ of the handle 14R is obtained based on a detection signal supplied from the operating angle sensor 72R, and a return force $F_R$ is determined according to the following expression, such that the return force $F_R$ has an amount corresponding to the obtained operating angle $\delta_R$ and acts in a direction that returns the handle 14R to the reference operating position.

$$F_R=G_{FR}\cdot\delta_R$$

In the above expression, "$G_{FR}$" represents a return-force gain, which is determined depending on whether the pair of handles 14 are being operated or not and according to the vehicle speed v, as described later in detail. Next, an electric current $I_{HR}$ supplied to the motor 60R is determined for exhibiting the determined return force $F_R$. Meanwhile, as another part of the control that is executed similarly for the left-side handle 14L, a return force $F_L$ is determined based on the operating angle $\delta_L$ of the handle 14L that is detected by the operating angle sensor 72L, and an electric current $I_{HL}$ supplied to the motor 60L is determined for exhibiting the determined return force $F_L$. In the present embodiment in which an electric power corresponding to the return force is determined, the electric current supplied to the motor is determined in the ECU 100 since the motor is controlled by a constant electric voltage. Then, commands relating to the determined electric currents $I_{HR}$, $I_{HL}$ are transmitted to respective invertors as drive circuits, and the electric currents $I_{HR}$, $I_{HL}$ are supplied to the respective motors 60R, 60L by the respective inverters.

The above-described return-force gain $G_{FR}$ and a return-force gain $G_{FL}$ for the left-side handle 14L are changed from a reference gain $K_F$ that is a gain for converting the operating angle into the return force. Specifically, each of the return-force gains $G_{FR}$, $G_{FL}$ is the reference gain $K_F$ multiplied by a corresponding one of first variables $\alpha_{FR}$, $\alpha_{FL}$ and a second variable $\beta_F$, wherein the first variables $\alpha_{FR}$, $\alpha_{FL}$ are determined depending on whether the pair of handles 14 are being operated or not while the second variable $\beta_F$ is determined based on the vehicle speed v. That is, the return-force gains $G_{FR}$, $G_{FL}$ are expressed by the following expressions:

$$G_{FR} = K_F \cdot \alpha_{FR} \cdot \beta_F$$

$$G_{FL} = K_S \cdot \alpha_{FL} \cdot \beta_F$$

Figure 9:
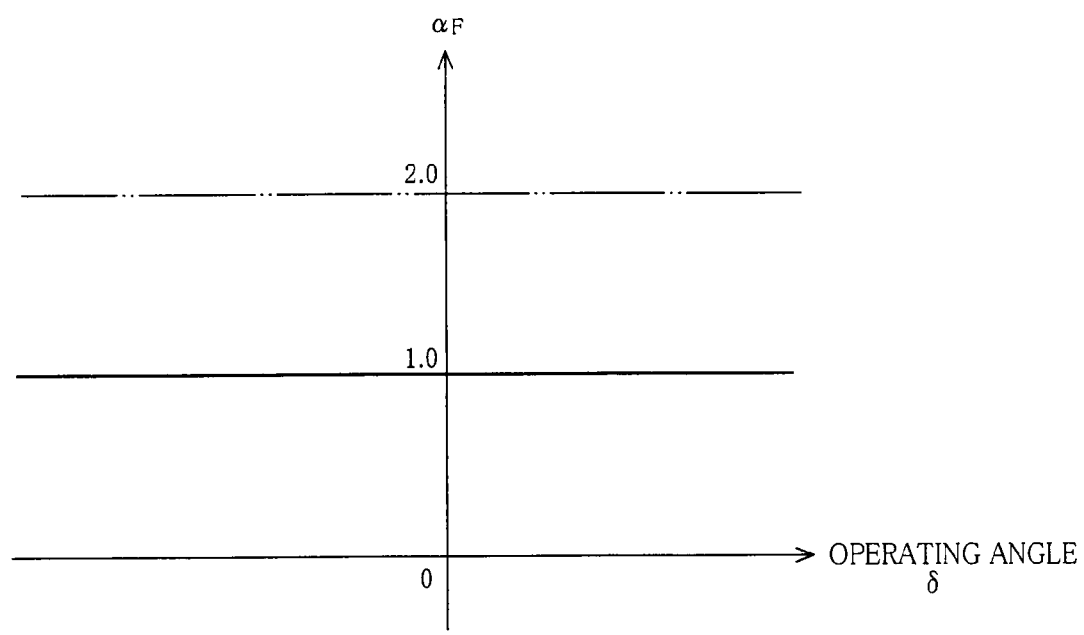
FIG. 9 is a view showing a relationship between the operating angle of the operating member and a first variable that is provided for changing a return-force gain based on the operating position of the operating member.
Figure 10:
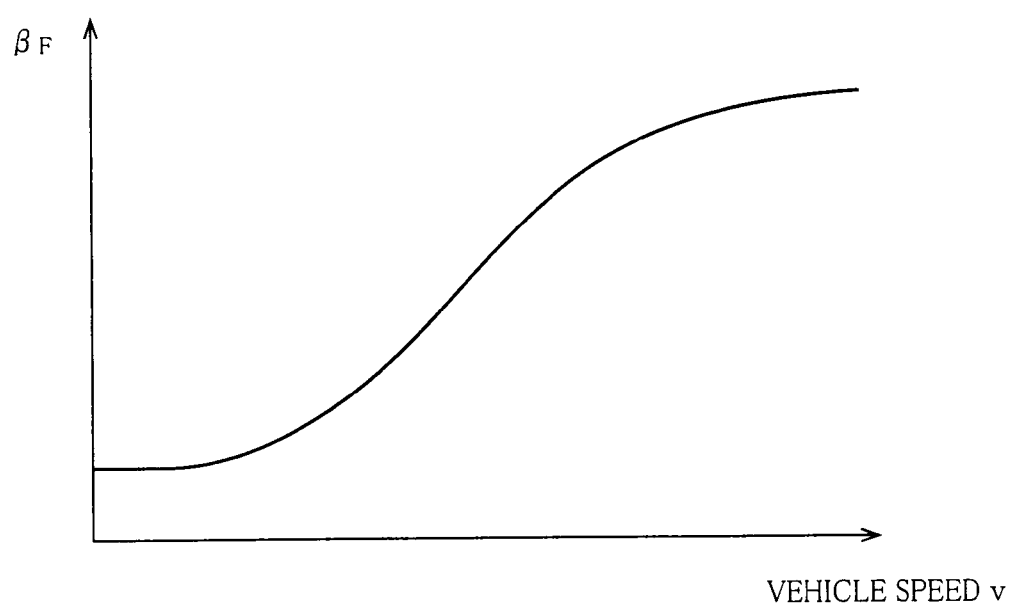
FIG. 10 is a view showing a relationship between the running speed of the vehicle and a second variable that is provided for changing the return-force gain based on the vehicle running speed.

As shown in FIG. 9, when the operation is performed by both hands, each of the first variables $\alpha_{FR}$, $\alpha_{FL}$ is set to 1.0. When it is determined, according to a manner as described above, that the operation is being performed by a single hand, the first variable $\alpha_F$ for one of the handles 14 that is being operated is changed from 1.0 to 2.0. Meanwhile, as shown in FIG. 10, the second variable $\beta_F$ is set to be increased as the vehicle speed v is increased. Thus, as the steering gain is changed depending on the vehicle speed, the return force F is increased whereby the target wheel-turning amount $\theta^*$ is made difficult to be large, when the vehicle speed v is high. That is, it is possible to improve stability of operation in the vehicle during running of the vehicle at a high speed. On the other hand, it is possible to reduce the return force for reducing burden imposed to the vehicle driver during running of the vehicle at a relatively low speed.

Figure 11:
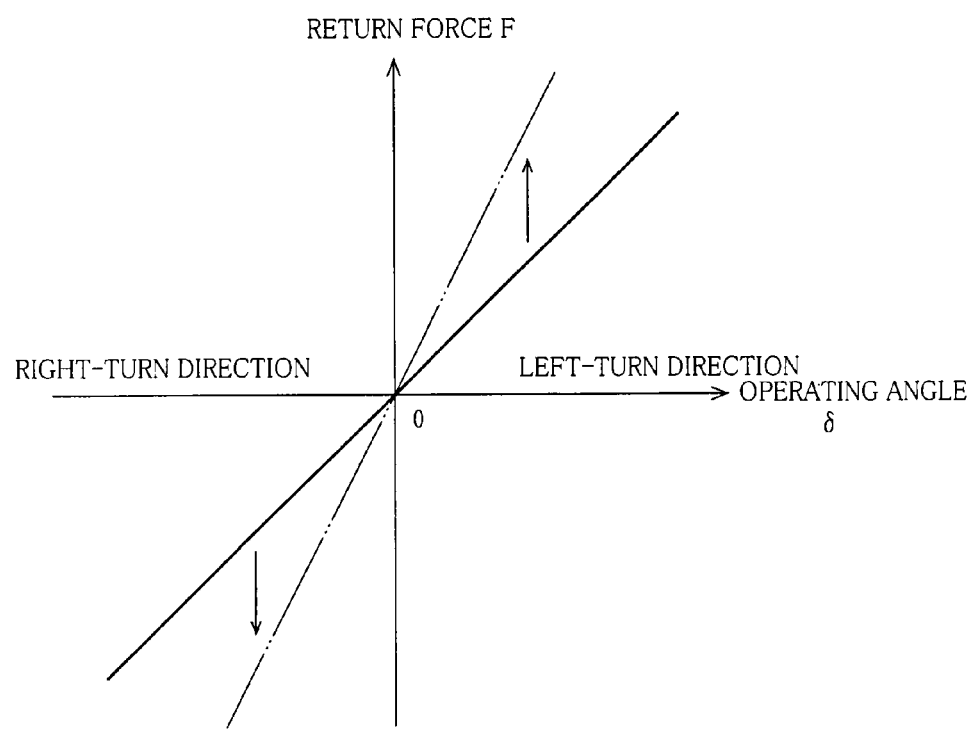
FIG. 11 is a view showing a relationship between the operating angle of the operating member and the return force.

As described above, after the first variables $\alpha_{FR}$, $\alpha_{FL}$ and the second variable $\beta_F$ have been determined, the return-force gains $G_{FR}$, $G_{FL}$ for the respective handles 14 are calculated. Then, the return forces $F_R$, $F_L$ for the respective handles 14 are determined. FIG. 11 is a schematic view showing a relationship between the operating angle of each of the pair of handles 14 and the return force for the handle 14 during running of the vehicle at a certain speed. As is understood from FIG. 11, in the operation performed by a single hand, the return force is twice as large as that in the operation performed by both hands, so that the vehicle driver can be provided with an operation feeling similar to that provided by a conventional steering wheel.

3. Control Programs

Figure 12:
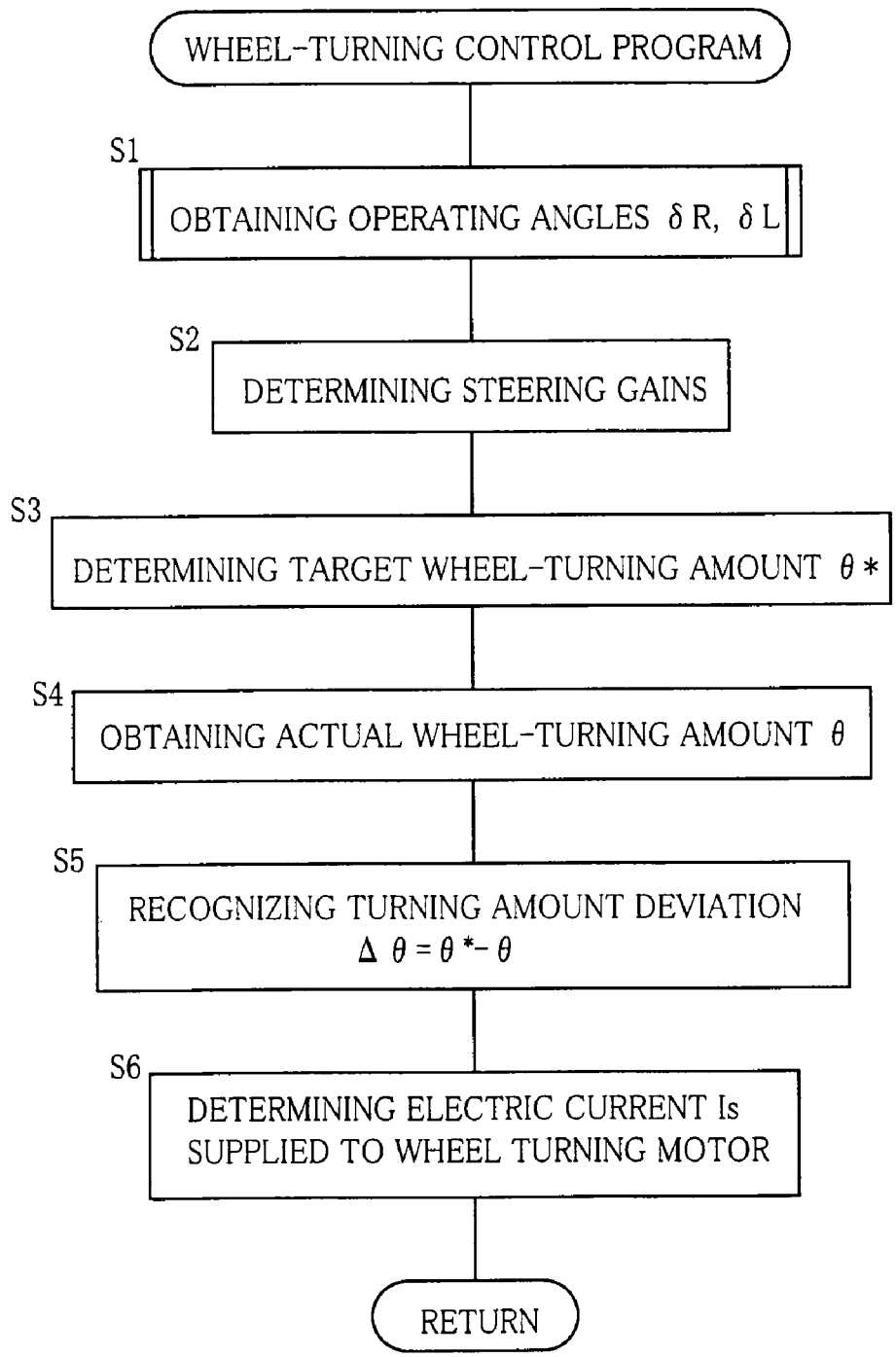
FIG. 12 is a flow chart showing a wheel-turning control program that is executed by an electronic control unit shown in FIG. 1.
Figure 14:
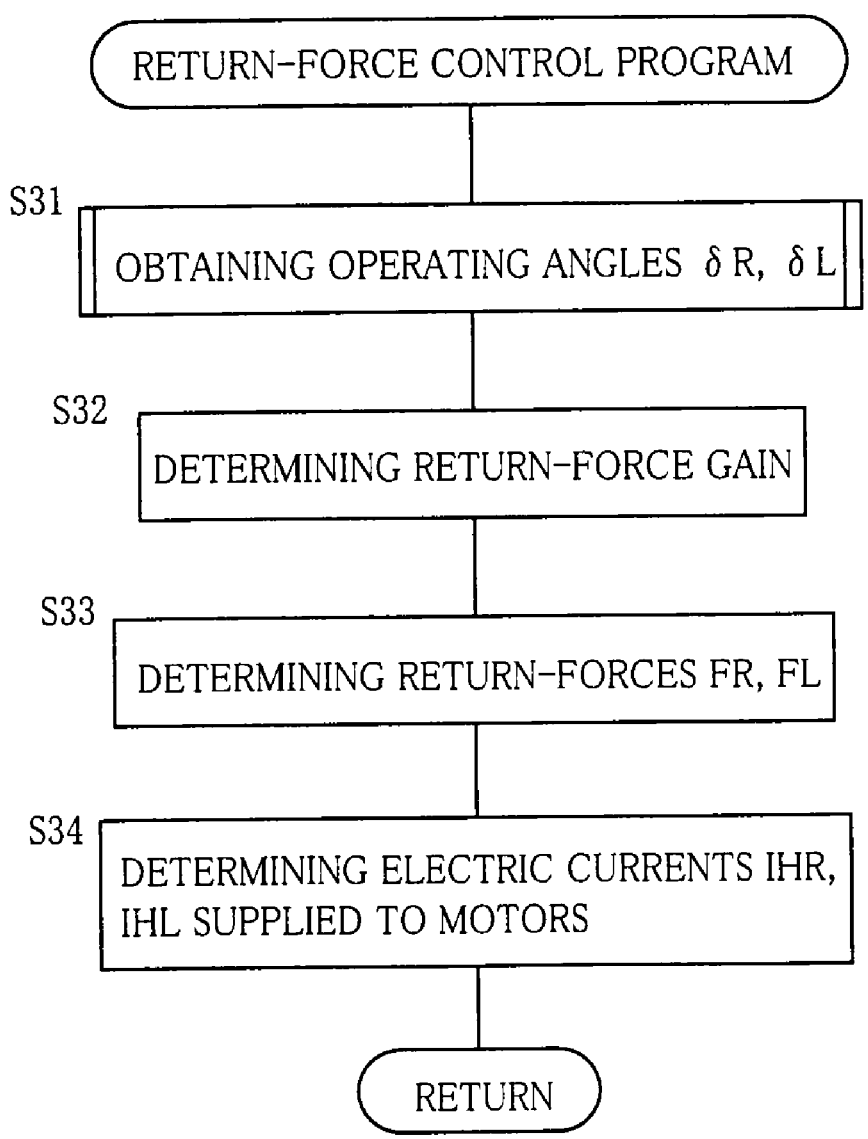
FIG. 14 is a flow chart showing a return-force control program that is executed by the electronic control unit shown in FIG. 1.

The present steering system is controlled by executing a wheel-turning control program and a return-force control program that are shown in flow charts of FIGS. 12 and 14, respectively. Each of these control programs is stored in the computer 102 of the ECU 100, and is repeatedly executed at a short time interval (e.g., several milliseconds to several tens of milliseconds) after an ignition switch of the vehicle has been placed in its ON state. Hereinafter, the control programs will be described in detail by reference to the flow charts.

In the wheel-turning control, step S1 (hereinafter abbreviated to as "S1" as well as the other steps) is first implemented to obtain the operating angles $\delta_R$, $\delta_L$ of the respective handles 14. Before the target wheel-turning amount $\theta^*$ is determined as a sum of the turning-amount components that are based on the operating angles $\delta_R$, $\delta_L$, as described above, a steering-gain determining sub-routine of S2 is executed whereby the steering gains $G_{SR}$, $G_{SL}$ that are used to determine the turning-amount components are determined.

Figure 13:
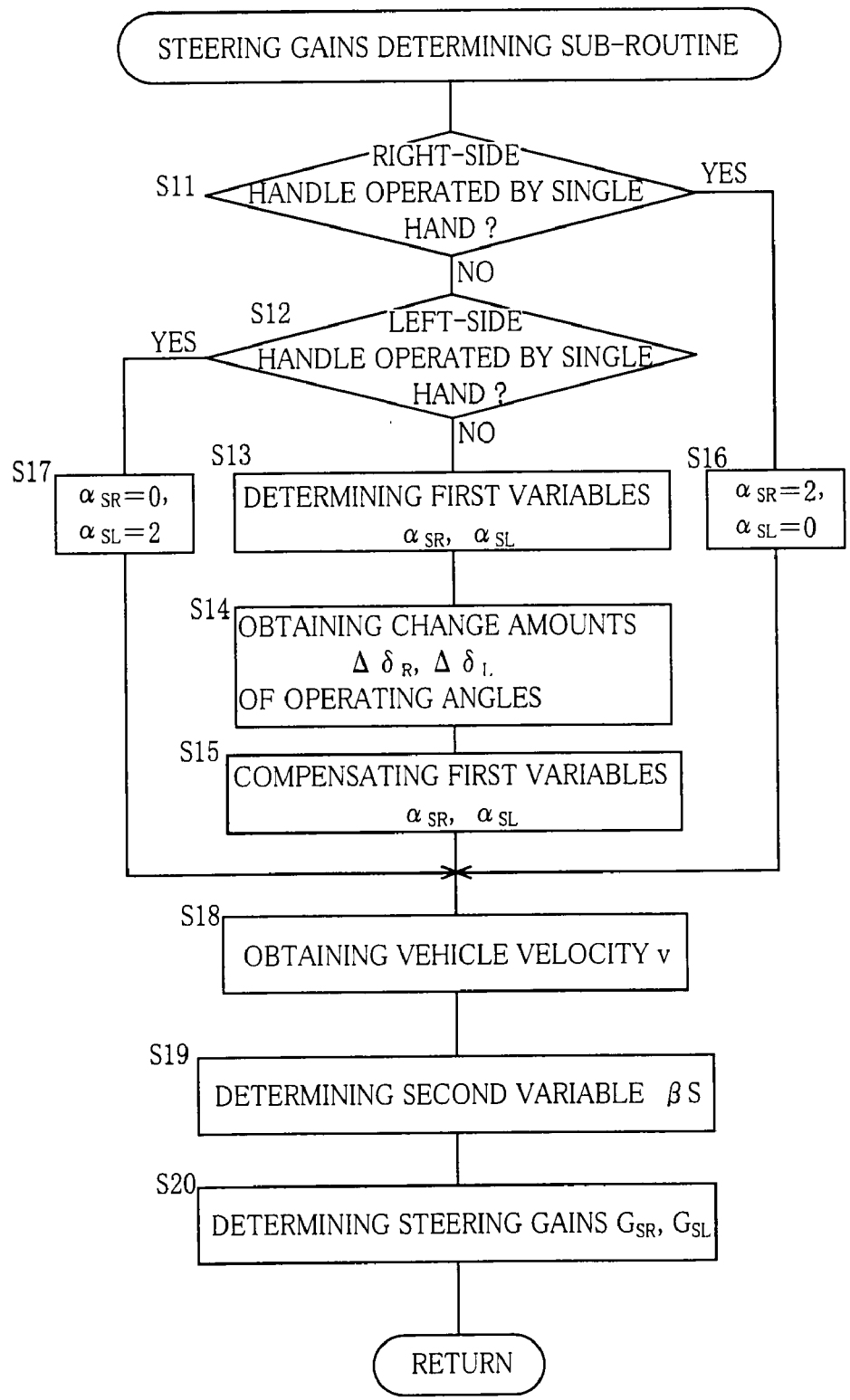
FIG. 13 is a flow chart showing a steering-gain determining sub-routine that is executed in the wheel-turning control program.

The steering-gain determining sub-routine is a routine for carrying out a control shown in a flow chart of FIG. 13. In this control, S11 and S12 are implemented to determine whether the operation is being performed by a single hand or not, so that the first variables $\alpha_{SR}$, $\alpha_{SL}$ are first determined. When the operation is being performed by both hands, S13 is implemented to determine the first variables $\alpha_{SR}$, $\alpha_{SL}$ based on the operating angles $\delta_R$, $\delta_L$ that have been obtained in S1. Described in detail, the computer 102 of the ECU 100 stores a map data, shown in FIG. 5, of the first variables $\alpha_{SR}$, $\alpha_{SL}$ that are dependent on respective parameters in the form of the operating angles $\delta_R$, $\delta_L$, so that the first variables $\alpha_{SR}$, $\alpha_{SL}$ are determined with reference to the map data. Then, S14 is implemented to calculate change amounts of the operating angles $\Delta\delta_R$, $\Delta\delta_L$ of the respective operating members as the operation velocities of the respective operating members, based on the operating angles obtained upon last execution of the program and the operating angles obtained upon current execution of the program. Then, in S15, the first variables $\alpha_{SR}$, $\alpha_{SL}$ determined in S13 are compensated when the operation velocity of the handle 14 positioned in the one side region is high, namely, when an absolute value of the operating-angle change amount is large. Described in detail, the compensating coefficient $\gamma$ is determined with reference to a map data, as shown in FIG. 6, which relates to the compensating coefficient $\gamma$ that is dependent on a parameter in the form of a corresponding one of the operating-angle change amounts $\Delta\delta_R$, $\Delta\delta_L$, so that each of the first variables $\alpha_{SR}$, $\alpha_{SL}$ is compensated by using the compensating coefficient, according to the above-described expression $\alpha_S = 1 - \gamma(1 - \alpha_S)$. When it is determined in S11 and S12 that the operation is being performed by a single hand, S16 and S17 are implemented whereby the first variable for the handle 14 that is being operated is set to 2.0 while the first variable for the handle 14 that is not being operated is set to 0.

Next, the second variable $\beta_S$ is determined based on the vehicle speed v that is obtained in S18. Described in detail, the second variable $\beta_S$ is determined with reference to a map data, shown in FIG. 7, of the second variable $\beta_S$ that is dependent on a parameter in the form of the vehicle speed v. Then, in S20, each of the steering gains $G_{SR}$, $G_{SL}$ is determined by multiplying the reference $K_S$ by the second variable $\beta_S$ and a corresponding one of the first variables $\alpha_{SR}$, $\alpha_{SL}$. The execution of the steering-gain determining sub-routine is completed with S20.

Next, in S3 of the wheel-turning control program, the target wheel-turning amount $\theta^*$ is determined by adding the turning-amount components for the respective handles 14, which are based on the steering gains $G_{SR}$, $G_{SL}$ (determined describe above) and the operating angles $\delta_R$, $\delta_L$ (obtained in S1). Then, S4 is implemented to obtain the actual wheel-turning amount $\theta$, and S5 is implemented to recognize the turning amount deviation $\Delta\theta$ as a deviation of the actual wheel-turning amount $\theta$ from the target wheel-turning amount $\theta^*$. Then, in S6, the electric current $I_S$ that is be supplied to the wheel turning motor 24 is determined based on the turning amount deviation $\Delta\theta$. One cycle of execution of the wheel-turning control program is completed by transmission of a command relating to the determined electric current $I_S$, from the inverter to the wheel turning motor 24. Whether the electric current $I_S$ is represented by a positive value or a negative value is dependent on the turning amount deviation $\Delta\theta$, and a rotational direction of the wheel turning motor 24 is determined depending on whether the electric current $I_S$ is represented by a positive value or a negative value.

The return-force control shown in a flow chart of FIG. 14 is initiated with S31 that is implemented to obtain the operating angles $\delta_R$, $\delta_L$ of the respective handles 14. Then, the return forces $F_R$, $F_L$ are determined by multiplying the operating angles $\delta_R$, $\delta_L$ by the return-force gains $G_{FR}$, $G_{FL}$, respectively.

The return-force gains $G_{FR}$, $G_{FL}$ are determined in a return-force determining sub-routine of S32.

Figure 15:
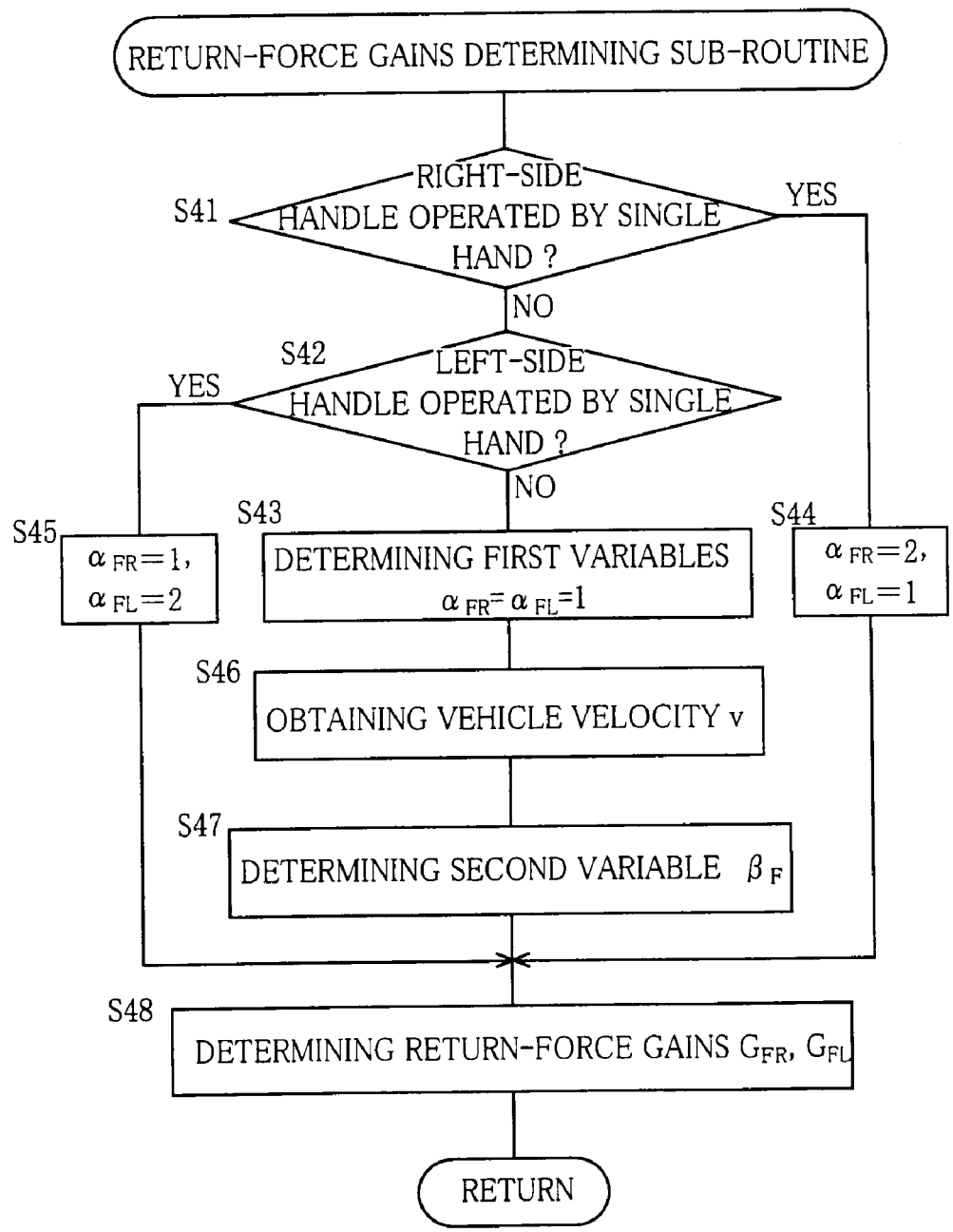
FIG. 15 is a flow chart showing a return-force determining sub-routine that is executed in the return-force control program.

The return-force determining sub-routine is a routine for carrying out a control shown in a flow chart of FIG. 15. This sub-routine is similar to the above-described steering-gain determining sub-routine, and will be described briefly. In this control, each of the first variables $\alpha_{FR}$, $\alpha_{FL}$ for calculating the respective return-force gains is not changed depending on the operating position but is changed depending on only whether the operation is being performed by a single hand or not. When it is not determined in S41 and S42 that the operation is being performed by a single hand, namely, when the operation is being performed by both hands, each of the first variables $\alpha_{FR}$, $\alpha_{FL}$ is set to 1.0. When it is determined in S41 and S42 that the operation is being performed by a single hand, one of the first variables for the handle 14 that is being operated is set to 2.0 in S44 and S45. Then, in S48, each of the return-force gains $G_{FR}$, $G_{FL}$ is determined by multiplying the reference $K_F$ by a corresponding one of the first variables $\alpha_{FR}$, $\alpha_{FL}$ and the second variable $\beta_F$ that is determined with reference to a map data of FIG. 10. The execution of the return-force determining sub-routine is completed with S48.

Next, in S33 of the return-force control program, the return forces $F_R$, $F_L$ that are to be applied to the respective handles 14 are determined. Then, S34 is implemented to determine the electric currents $I_{HR}$, $I_{HL}$ that are to be supplied to the respective motors 60R, 60L, for exhibiting the return forces $F_R$, $F_L$. One cycle of execution of the return-force control program is completed by transmission of commands relating to the determined electric currents $I_{HR}$, $I_{HL}$ to the respective motors 60R, 60L. Whether each of the electric currents $I_{HR}$, $I_{HL}$ is represented by a positive value or a negative value is dependent on a corresponding one of the return forces $F_R$, $F_L$, and a rotational direction of each of the motors 60R, 60L is determined depending on whether a corresponding one of the electric currents $I_{HR}$, $I_{HL}$ is represented by a positive value or a negative value.

Figure 16:
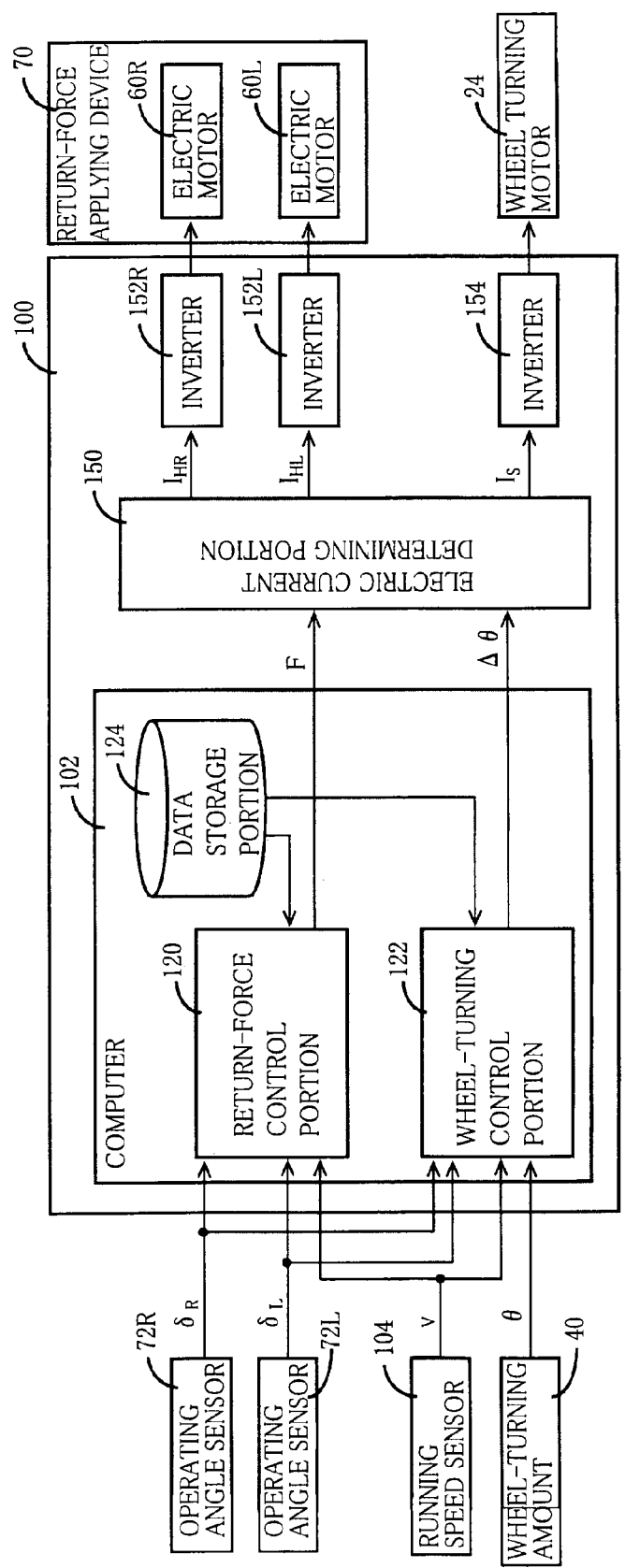
FIG. 16 is a block diagram for showing functions of the electronic control unit provided in the vehicle steering system of FIG. 1.

The wheel-turning control program and return-force control program described above are repeatedly executed until the ignition switch is placed in its OFF state. FIG. 16 is a block diagram for showing functions of the ECU 100 as described above. Based on the above-described functions, the computer 102 of the ECU 100 is constructed to include a return-force control portion 120 configured to perform the return force control, a wheel-turning control portion 122 configured to perform the wheel turning control, and a data storage portion 124 storing various data such as the above-described map data used for the return force control and the wheel turning control. The return force F and the turning amount deviation $\Delta\theta$ determined in the return-force control portion 120 and wheel-turning control portion 122, respectively, are outputted from the computer 102 to an electric-current determining portion 150 that is also included in the ECU 100, so that the electric currents $I_{HR}$, $I_{HL}$ supplied to the respective motors 60R, 60L of the return-force applying device 70 and the electric current $I_S$ supplied to the wheel turning motor 24 of the wheel turning device 12 are determined based on the return force F and the turning amount deviation $\Delta\theta$. The electric currents $I_{HR}$, $I_{HL}$, $I_S$ are supplied to the motors 60R, 60L and wheel turning motor 24 via the inverters 152R, 152L, 154, respectively.

As described above, the present steering system is constructed such that the steering gain and the return-force gain are changeable depending on the above-described parameters, so as to have such steering characteristics that cause one and the other of the operating members to be switched, for example, depending on whether the vehicle is to be caused to turn right or left, so as to alternately serve as a main operating member, and thereby making it possible to improve operability of the system. Further, it is possible to improve easiness of the operation performed by the vehicle driver and stability of the running vehicle, too. Further, the present steering system is a steering system of independent operation type that can be operated abruptly and operated by a single hand.

Second Embodiment

Figure 17:
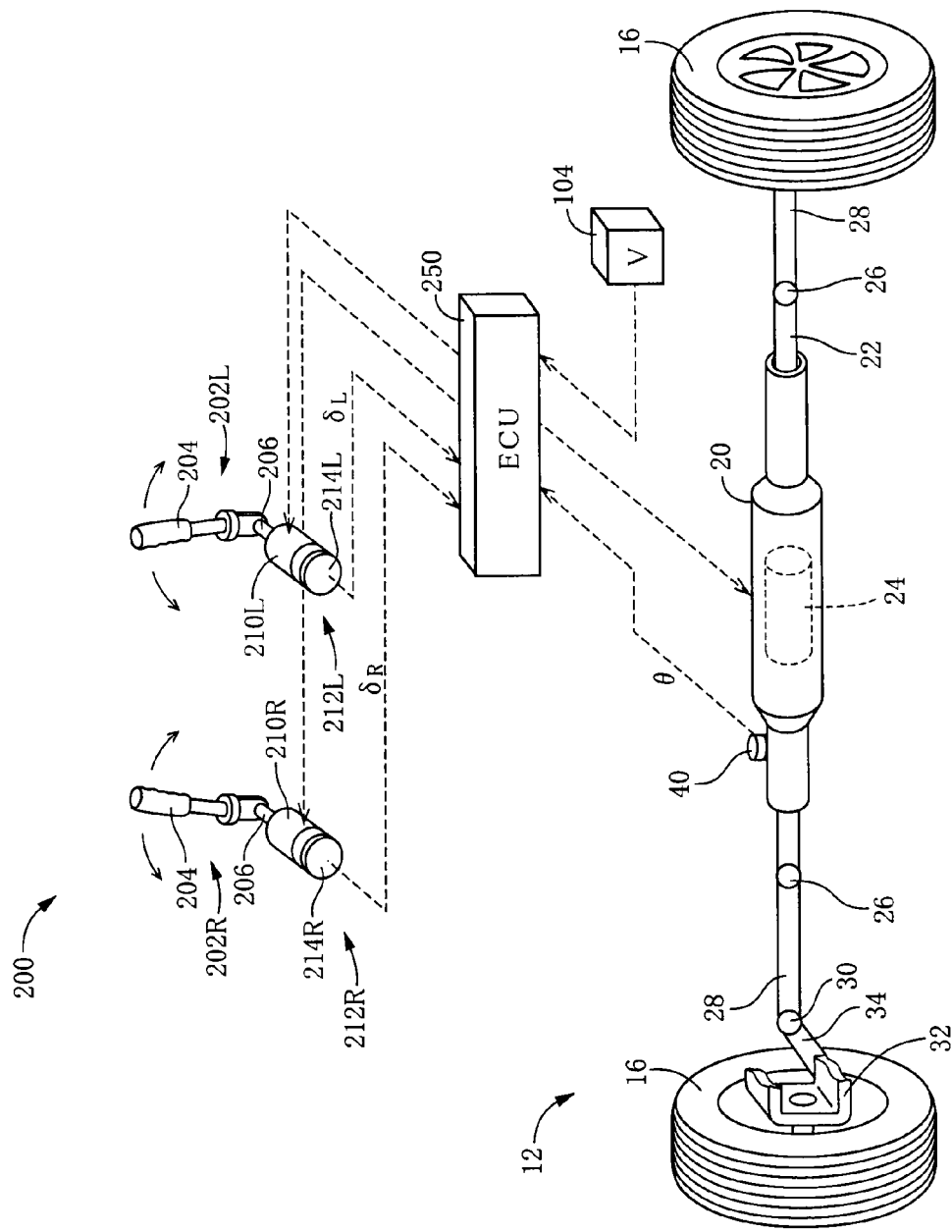
FIG. 17 is a schematic view showing an overall construction of a steering system for a vehicle, which is a second embodiment of the claimable invention.

FIG. 17 is a view schematically showing an overall construction of a steering system that is a second embodiment of the claimable invention. The system of the present embodiment is of independent operation type and steer-by-wire type as the system of the first embodiment. Since the system of the present embodiment is identical in hardware with the system of the first embodiment except for the operating device, the same reference signs will be used to identify constructional elements having the same functions as those in the system of the first embodiment, so as to indicate the correspondences, and description of these elements will be omitted.

Figure 18:
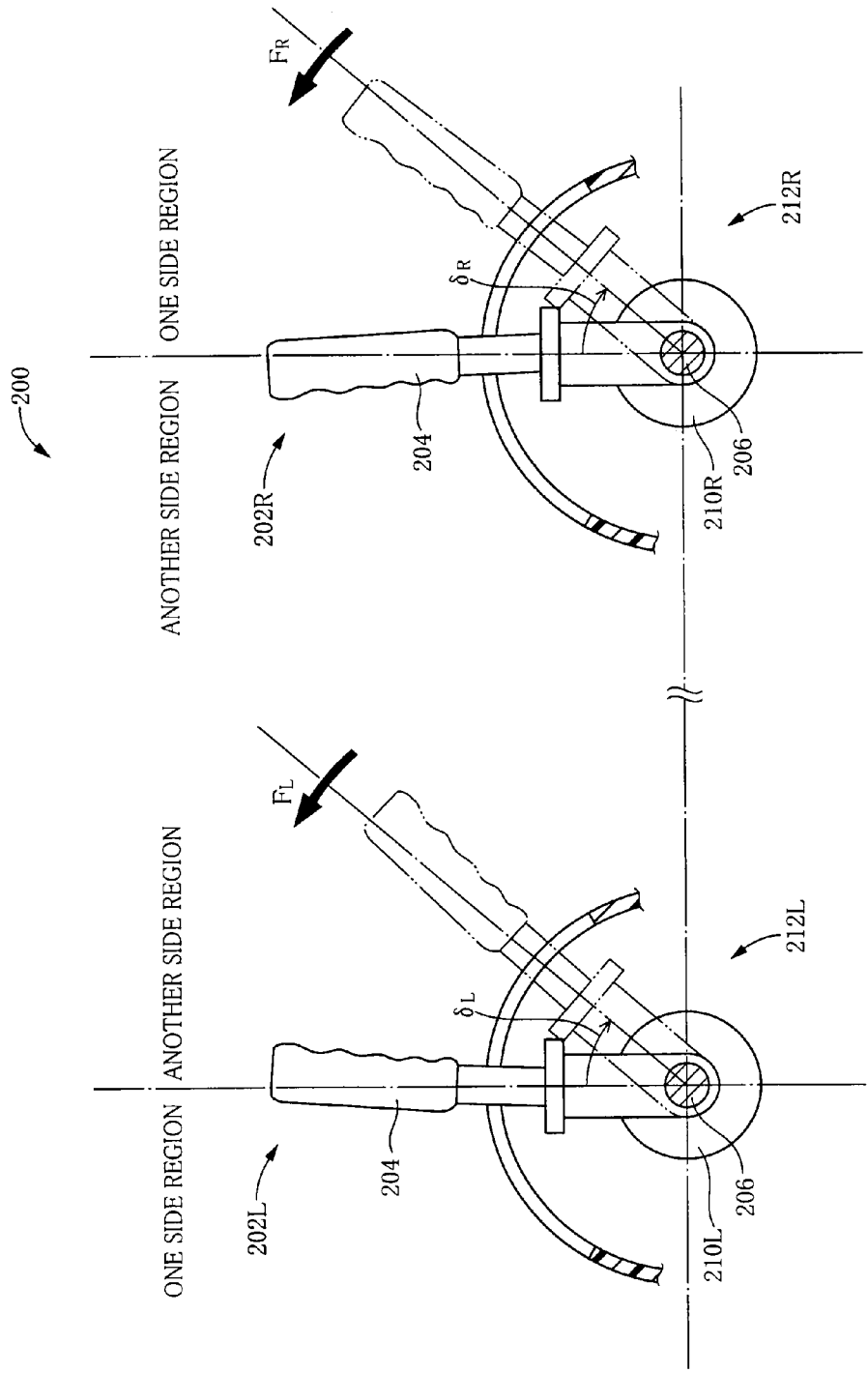
FIG. 18 is a front view (view as seen from side of a vehicle driver) of an operating device included in the steering system of FIG. 17.

There will be described an operating device 200 that is provided in the system of the present embodiment, with reference to FIG. 18 that is its front view (view as seen from side of a driver's seat). The operating device 200 is constructed to include a pair of joysticks 202R, 202L (hereinafter generally referred to as "joysticks 202") in place of the pair of handles 14. The pair of joysticks 202R, 202L are arranged as a right-side joystick and a left-side joystick, respectively, in a lateral direction of the driver's seat. The joysticks 202 have respective upper portions serving as grip portions 204 that are to be operated by respective right and left hands of the vehicle driver. A stick rod 206 is fixed to a lower end portion of each of the pair of joysticks 202, and extends perpendicularly to the joystick 202 in a longitudinal direction of the vehicle. The stick rod 206 is supported pivotably about its axis whereby the corresponding joystick 202 is tiltable in the lateral direction so as to be operatively movable along an arcuate-shaped orbit. Each of the pair of joysticks 202 takes substantially a vertical posture when being positioned in a reference operating position (position indicated by solid line in FIG. 18). The vehicle is caused to turn right when either one or both of the pair of joysticks 202 are tilted rightward from the reference operating position or positions. The vehicle is caused to turn left when either one or both of the pair of joysticks 202 are tilted rightward from the reference operating position or positions.

The stick rods 206 fixed to the respective joysticks 202R, 202L are connected to respective electric motors 210R, 210L that are fixed to respective parts of the vehicle body. As those in the first embodiment, the motors 210R, 210L are motors having respective speed reducers, and function as power sources of respective return-force applying devices 212R, 212L that are configured to apply respective return forces F for returning the respective joysticks 202 to the respective reference operating positions. Further, as those in the first embodiment, the motors 210R, 210L are equipped with respective operating angles sensors 214R, 214L that are capable of detecting operating angles $\delta_R$, $\delta_L$ of the respective joysticks 202R, 202L from the respective reference operating positions. Each of the operating angles $\delta_R$, $\delta_L$ is represented by a positive value when the corresponding joystick 202 is tilted rightward as shown in FIG. 18, and is represented by a negative value when the corresponding joystick 202 is tilted leftward. Further, the return force F is represented by a positive value when being applied upon rightward tilting of the joystick 202 (namely, when acting in a direction that causes the joystick 202 to be pivoted leftward), and is represented by a negative value when being applied upon leftward tilting of the joystick 202 (namely, when acting in a direction that causes the joystick 202 to be pivoted rightward).

The system of the present embodiment is equipped with ECU 250, which executes two controls, i.e., wheel-turning control and return-force control as that of the first embodiment. However, these controls are different from those in the first embodiment. Described in detail, a manner of determination of the return-force gain made in the return-force control and a manner of determination of the steering gain made in the wheel-turning control are different from those in the first embodiment.

In each of the joysticks 202 provided in the present steering system, from an ergonomic point of view, the operation in a region in which the joystick 202 has been tilted from the reference operating position in a direction away from the other joystick 202 (described in detail, in a region in which the right-side joystick 202R has been tilted rightward and in a region in which the left-side joystick 202L has been tilted leftward) is difficult to be performed as compared with the operation in a region in which the joystick 202 has been tilted from the reference operating position in a direction toward the other joystick 202 (described in detail, in a region in which the right-side joystick 202R has been tilted leftward and in a region in which the left-side joystick 202L has been tilted rightward). By taking account of this, the orbit of each of the joysticks 202 is sectioned into two regions, and one of the two regions in which the joystick 202 has been pivoted from the reference operating position in the direction away from the other joystick 202 is referred to as one side region, while the other of the two regions in which the joystick 202 has been pivoted from the reference operating position in the direction toward the other joystick 202 is referred to as another side region. The return-force gains $G_{FR}$, $G_{FL}$ are determined such that each of the return-force gains $G_{FR}$, $G_{FL}$ is larger when a corresponding one of the joysticks 202 is positioned in the one side region than when the corresponding joystick 202 is positioned in the other side region. That is, in the system of the present embodiment, each of the return-force gains $G_{FR}$, $G_{FL}$ is changed depending on the operating position of a corresponding one of the pair of joysticks 202.

Figure 19:
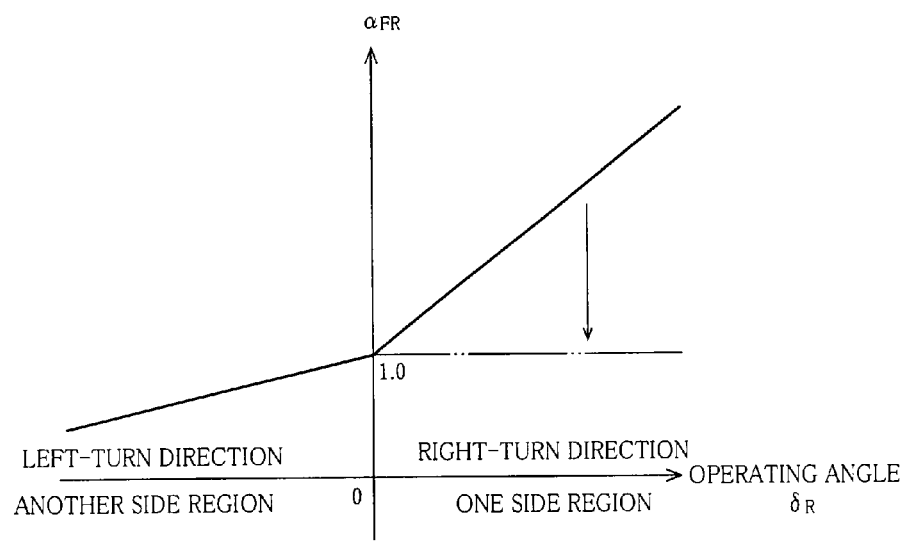
FIG. 19 is a set of views showing a relationship between the operating angle of the operating member and a first variable that is provided for changing the return-force gain based on the operating position of the operating member.
Figure 19:
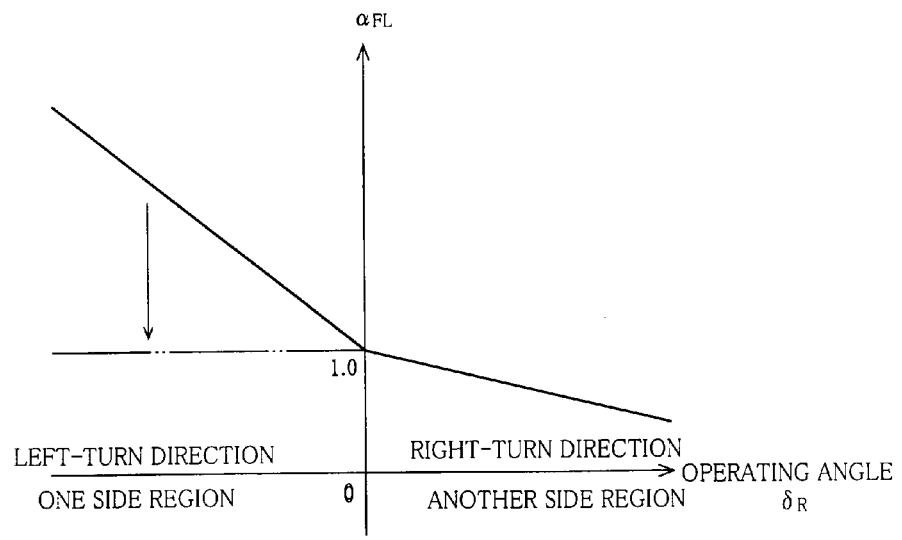
Figure 20:
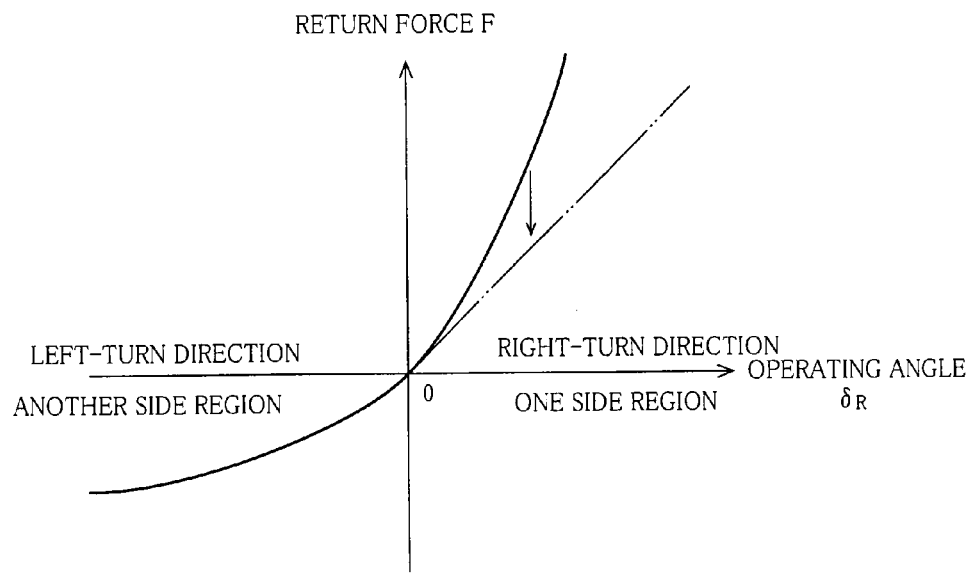
FIG. 20 is a set of views each showing a relationship between the operating angle of the operating member and the return force for the operating member.
Figure 20:
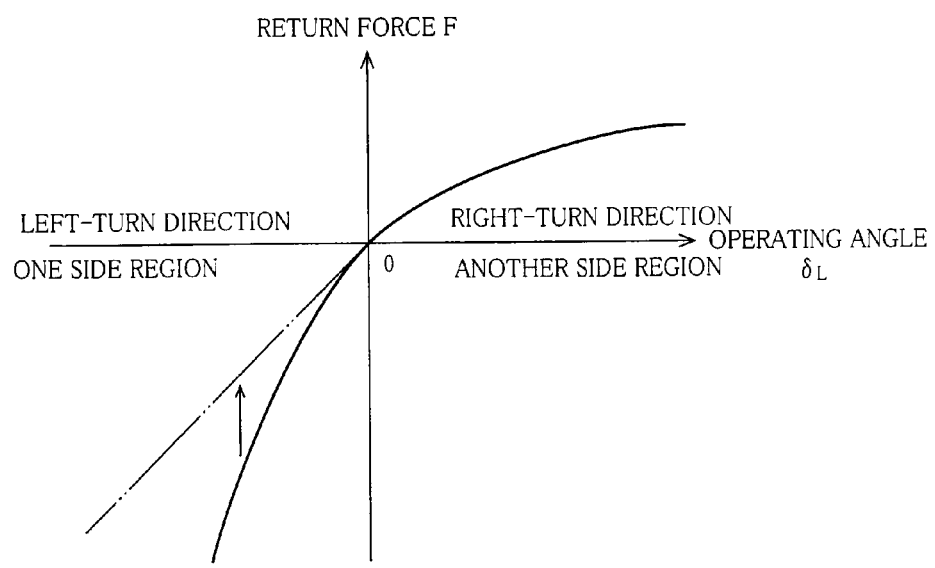

As in the first embodiment, each of the return-force gains $G_{FR}$, $G_{FL}$ is calculated by multiplying the reference gain $K_F$ by a corresponding one of the first variables $\alpha_{FR}$, $\alpha_{FL}$ and the second variable $\beta_F$. In the return-force control of the present embodiment, each of the first variables $\alpha_{FR}$, $\alpha_{FL}$ is determined based on a corresponding one of the operating angles $\delta_R$, $\delta_L$ of the respective joysticks 202. Described in detail, as is understood from a view of FIG. 19 (a), the first variable $\alpha_{FR}$ for the right-side joystick 202R has a value which is reduced as the joystick 202R is pivoted in the left-turn corresponding direction, and which is increased as the joystick 202R is pivoted in the right-turn corresponding direction. On the other hand, as is understood from a view of FIG. 19 (b), the first variable $\alpha_{FL}$ for the left-side joystick 202L has a value which is increased as the joystick 202L is pivoted in the left-turn corresponding direction, and which is reduced as the joystick 202L is pivoted in the right-turn corresponding direction. The second variable $\beta_F$ used for determining the return-force gains $G_{FR}$, $G_{FL}$ is set to be increased as the vehicle speed v is increased, as shown in FIG. 10 as in the first embodiment. As described above, after the first variables $\alpha_{FR}$, $\alpha_{FL}$ and the second variable $\beta_F$ have been determined, the return-force gains $G_{FR}$, $G_{FL}$ for the respective joysticks 202 are calculated, and the return forces $F_R$, $F_L$ for the respective joysticks 202 are determined. FIG. 20 shows a relationship between the operating angle of each of the pair of joysticks 202 and the return force for the joystick 202 during running of the vehicle at a certain speed.

Next, there will be studied a case of operation performed by a single hand. In a state in which the return force is controlled as described above, burden imposed on the vehicle driver is large during operation of the joystick 202 from the reference operating position in a direction away from the other joystick 202 since a reaction force against the operation is large. In view of this, the ECU 250 is configured to change the first variables $\alpha_{SR}$, $\alpha_{SL}$ when the other of the pair of joysticks 202 is not being operated. Described in detail, the first variable $\alpha_F$ for the joystick 202 that is being operated is changed to 1.0 (see two-dot chain line in FIG. 19) whereby an amount of the return force F is reduced (see two-dot chain line in FIG. 20), when the joystick 202 is positioned in the one side region. Like in the first embodiment, it is determined that, when only one of the joysticks 202 is operated from a state in which both of the joysticks 202 are positioned in the respective reference operating positions, the other of the joysticks 202 is not being operated.

Figure 21:
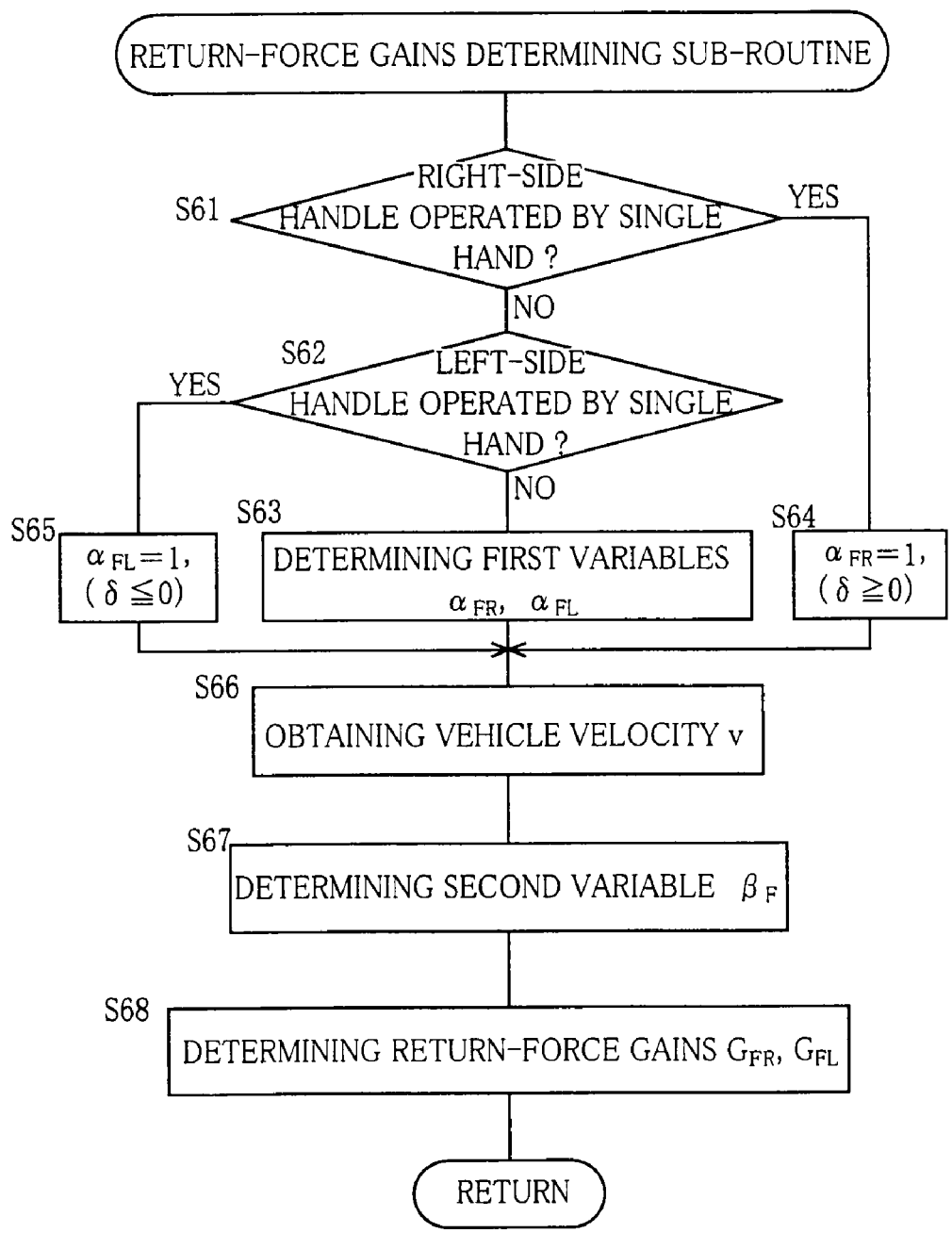
FIG. 21 is a flow chart showing the return-force determining sub-routine that is executed in the return-force control program.

Like in the first embodiment, the above-described return-force control is performed by execution of the return-force control program shown in the flow chart of FIG. 14. In S32, a return-force determining sub-routine shown in a flow chart of FIG. 21 is executed. In this control, S61 and S62 are implemented to determine whether the operation is being performed by a single hand or not. When the operation is being performed by both hands, S63 is implemented to determine the first variables $\alpha_{FR}$, $\alpha_{FL}$ based on the operating angles $\delta_R$, $\delta_L$ that have been obtained in S31. Described in detail, the computer of the ECU 250 stores a map data, shown in FIG. 19, of the first variables $\alpha_{FR}$, $\alpha_{FL}$ that are dependent on respective parameters in the form of the operating angles $\delta_R$, $\delta_L$, so that the first variables $\alpha_{FR}$, $\alpha_{FL}$ are determined with reference to the map data. When it is determined in S61 and S62 that the operation is being performed by a single hand, S64 and S65 are implemented, whereby the first variable for the joystick 202 that is being operated is set to 1.0 when the joystick 202 is positioned in the one side region.

Figure 22:
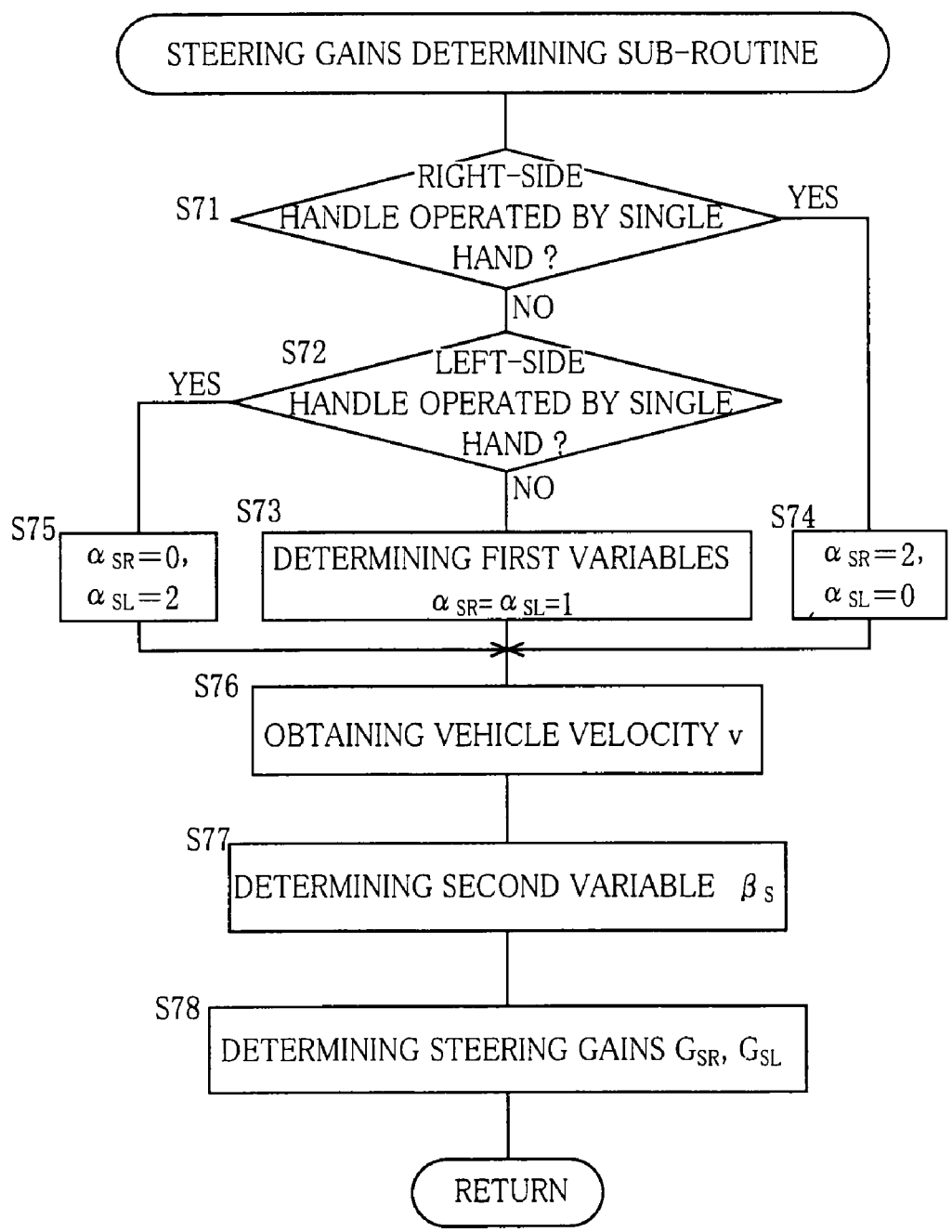
FIG. 22 is a flow chart showing the steering-gain determining sub-routine that is executed in the wheel-turning control program.

Each of the steering gains $G_{SR}$, $G_{SL}$ is calculated by multiplying by a corresponding one of the first variables $\alpha_{SR}$, $\alpha_{SL}$ and the second variable $\beta_S$, as in the first embodiment. However, in the wheel turning control of the present embodiment, each of the first variables $\alpha_{SR}$, $\alpha_{SL}$ takes a value which is not changed depending on the operating position of a corresponding one of the pair of joysticks 202 but is changed depending on whether the other of the pair of joysticks 202 is being operated or not. Described in detail, when both of the joysticks 202 are being operated, each of the first variables $\alpha_{SR}$, $\alpha_{SL}$ is set to 1.0. When it is determined that the operation is being performed by a single hand, the first variable for the joystick 202 that is being operated is set to 2.0 for causing the wheels to be turned even in operation of the single hand by substantially the same amount as in operation of both hands, while the first variable for the joystick 202 that is not being operated is set to 0. The second variable $\beta_S$ used for determining the steering gains $G_{SR}$, $G_{SL}$ is set to be reduced as the vehicle speed v is increased, as in the first embodiment. This wheel turning control is performed by execution of the wheel-turning control program shown in the flow chart of FIG. 12 as in the first embodiment. However, in S2, a steering-gain determining sub-routine shown in a flow chart of FIG. 22 is executed.

In the present steering system in which the return force is controlled as described above, an operation amount by which each joystick 202 is operatively moved in the direction away from the other joystick 202 is made smaller than an operation amount by which each joystick 202 is operatively moved in the direction toward the other joystick 202, whereby the operation of each joystick 202 performed in the direction toward the other joystick 202 constitutes a main operation. That is, in the present embodiment, too, as in the first embodiment, the system has such steering characteristics that cause one and the other of the operating members to be switched so as to alternately serve as a main operating member, and thereby making it possible to improve operability of the system.

The invention claimed is:

1. A steering system for a vehicle, comprising:
   a pair of operating members operable independently of each other so as to be movable along given orbits, respectively;
   a wheel turning device configured to turn a wheel of the vehicle;
   a pair of return-force applying devices each having a power source that is controllable to apply, to a corresponding one of said pair of operating members, a return force as a force for returning said corresponding one of said pair of operating members to a return-force reference operating position that is set for said corresponding one of said pair of operating members;
   a controlling device having (a) a wheel-turning control portion which is configured to determine a target wheel-turning amount of the wheel based on an amount of operation of each of said pair of operating members from a wheel-turning reference operating position that is set for said each of said pair of operating members and to control said wheel turning device for equalizing an actual wheel-turning amount of the wheel to the target wheel-turning amount of the wheel, and (b) a return-force control portion which is configured to determine the return force for returning each of said pair operating members, based on an amount of operation of said each of said pair of operating members from the return-force reference operating position that is set for said each of said pair of operating members and to control the power source of each of said pair of return-force applying devices for causing the power source so as to exhibit the return force;
   wherein said controlling device is capable of changing at least one of (A) a steering gain that is set for each of said pair of operating members upon determination of the target wheel-turning amount and (B) a return-force gain that is set for each of said pair of operating members upon determination of the return force,
   and wherein at least one of the steering gain and the return-force gain that are set for each of said pair of operating members is changed depending on an operating position of said each of said pair of operating members, and is changed depending on whether said each of said pair of operating members is positioned in one side region or another side region of a corresponding one of the given orbits, which are close to one and the other of opposite ends of the corresponding orbit, respectively, so that a value of each of said at least one of the steering gain and the return-force gain upon positioning of each of said operating members in the one side region of said corresponding orbit is different from a value of said each of said at least one of the steering gain and the return-force gain upon positioning of said each of said operating members in the other side region of said corresponding orbit.

2. The steering system according to claim 1, wherein the wheel-turning reference operating position and the return-force reference operating position of each of said pair of operating members are set in the same operating position.

3. The steering system according to claim 1,
   wherein said controlling device is capable of changing at least the steering gain that is set for each of said pair of operating members,
   and wherein the value of the steering gain upon positioning of said each of said operating members in the one side region of a corresponding one of the given orbits is smaller than the value of the steering gain upon positioning of said each of said operating members in the other side region of the corresponding orbit.

4. The steering system according to claim 1,
   wherein said controlling device is capable of changing at least the steering gain that is set for each of said pair of operating members,
   and wherein the steering gain is reduced as the operating position of said each of said pair of operating members becomes closer to the one of the opposite ends of a corresponding one of the given orbits, and is increased as the operating position of each of said pair of operating members becomes closer to the other of the opposite ends of the corresponding orbit.

5. The steering system according to claim 1,
   wherein said controlling device is capable of changing at least the return-force gain that is set for each of said pair of operating members,
   and wherein the value of the return-force gain upon positioning of said each of said operating members in the one side region of a corresponding one of the given orbits is larger than the value of the return-force gain upon positioning of said each of said operating members in the other side region of the corresponding orbit.

6. The steering system according to claim 1,
   wherein said controlling device is capable of changing at least the return-force gain that is set for each of said pair of operating members,
   and wherein the return-force gain is increased as the operating position of said each of said pair of operating members becomes closer to the one of the opposite ends of a corresponding one of the given orbits, and is reduced as the operating position of each of said pair of operating members becomes closer to the other of the opposite ends of the corresponding region.

7. The steering system according to claim 1, wherein the one side region is set as a region in which an operation of each of said pair of operating members is difficult to be performed as compared with an operation of said each of said pair of operating members performed in the other side region.

8. The steering system according to claim 1,
   wherein said pair of operating members are a pair of handles which are respectively arranged as a right-side handle and a left-side handle in a lateral direction of the vehicle, and which are operable to be moved along the respective orbits each extending generally in a longitudinal direction of the vehicle, a vertical direction of the vehicle or an inclined direction that is inclined with respect to the longitudinal and vertical directions,
   wherein each of an operation of the right-side handle performed in a direction toward a driver of the vehicle and an operation of the left-side handle performed in a direction away from the driver is an operation performed in a right-turn corresponding direction corresponding to turning of the wheel performed in a direction that causes the vehicle to turn right, while each of an operation of the right-side handle performed in a direction away from the driver of the vehicle and an operation of the left-side handle performed in a direction toward the driver is an operation performed in a left-turn corresponding direction corresponding to turning of the wheel performed in a direction that causes the vehicle to turn left, operating members performed toward the one of the opposite ends away from the other of the opposite ends, while each of the operation of the right-side joystick performed in the direction toward the left-side joystick and the operation of the left-side joystick performed in the direction toward the right-side joystick is set as an operation of each of said pair of operating members performed toward the other of the opposite ends away from the one of the opposite ends.

9. The steering system according to claim 1,
wherein said pair of operating members are a pair of joysticks which are respectively arranged as a right-side joystick and a left-side joystick in a lateral direction of the vehicle, and which are tiltable generally in the lateral direction so as to be operable to be moved along the respective orbits each arcuate-shaped,
wherein each of an operation of the right-side joystick performed in a direction away from the left-side joystick and an operation of the left-side joystick performed in a direction toward the right-side joystick is an operation performed in a right-turn corresponding direction corresponding to turning of the wheel performed in a direction that causes the vehicle to turn right, while each of an operation of the right-side joystick performed in a direction toward the left-side joystick and an operation of the left-side joystick performed in a direction away from the right-side joystick is an operation performed in a left-turn corresponding direction corresponding to turning of the wheel performed in a direction that causes the vehicle to turn left,
and wherein each of the operation of the right-side joystick performed in the direction away from the left-side joystick and the operation of the left-side joystick performed in the direction away from the right-side joystick is set as an operation of each of said pair of operating members performed toward the one of the opposite ends away from the other of the opposite ends, while each of the operation of the right-side joystick performed in the direction toward the left-side joystick and the operation of the left-side joystick performed in the direction toward the right-side joystick is set as an operation of each of said pair of operating members performed toward the other of the opposite ends away from the one of the opposite ends.

10. The steering system according to claim 1, wherein said controlling device is configured to change at least one of the steering gain and the return-force gain that are set for each of said pair of operating members, depending on an operation velocity of said each of said pair of operating members at which said each of said pair of operating members is operated.

11. The steering system according to claim 10,
wherein said controlling device is capable of changing at least the steering gain that is set for each of said pair of operating members,
and wherein the steering gain is made larger when the operation velocity of said each of said pair of operating members is high, than when the operation velocity of said each of said pair of operating members is low.

12. The steering system according to claim 11,
wherein said controlling device is configured to change the steering gain that is set for each of said pair of operating members, depending on the operating position of said each of said pair of operating members,
and wherein the steering gain that is set for each of said pair of operating members is changed depending on whether said each of said pair of operating members is positioned in the one side region or the other side region of a corresponding one of the given orbits, such that a value of the steering gain upon positioning of each of said operating members in the one side region of said corresponding orbit is smaller than a value of the steering gain upon positioning of said each of said operating members in the other side region of said corresponding orbit, and such that the value of the steering gain upon positioning of each of said operating members in the one side region becomes close to the value of the steering gain upon positioning of said each of said operating members in the other side region when the operation velocity of said each of said pair of operating members is high.

13. The steering system according to claim 1, wherein said controlling device is configured to change at least one of the steering gain and the return-force gain that are set for each of said pair of operating members, such that said at least one of the steering gain and the return-force gain that are set for one of said pair of operating members is changed depending on whether the other of said pair of operating members is being operated or not.

14. The steering system according to claim 13,
wherein said controlling device is capable of changing at least the steering gain,
and wherein the steering gain set for one of said pair of operating members is made larger when the other of said pair of operating members is not being operated, than when said other of said pair of operating members is being operated.

15. The steering system according to claim 14,
wherein said controlling device is configured to change the steering gain that is set for each of said pair of operating members, depending on the operating position of said each of said pair of operating members,
wherein the steering gain that is set for each of said pair of operating members is changed depending on whether said each of said pair of operating members is positioned in the one side region or the other side region of a corresponding one of the given orbits, such that a value of the steering gain upon positioning of each of said operating members in the one side region of said corresponding orbit is smaller than a value of the steering gain upon positioning of each of said operating members in the other side region of said corresponding orbit,
and wherein the value of the steering gain of one of said pair of operating members upon positioning of said one of said operating members in the one side region becomes close to the value of the steering gain of said one of said pair of operating members upon positioning of said one of said operating members in the other side region when the other of said pair of operating members is not being operated.

16. The steering system according to claim 13,
wherein said controlling device is capable of changing at least the return-force gain that is set for each of said pair of operating members,
and wherein the return-force gain set for one of said pair of operating members is made smaller when the other of said pair of operating members is not being operated, than when said other of said pair of operating members is being operated.

17. The steering system according to claim 16,
wherein said controlling device is configured to change the return-force gain that is set for each of said pair of operating members, depending on the operating position of said each of said pair of operating members,
wherein the return-force gain that is set for each of said pair of operating members is changed depending on whether said each of said pair of operating members is positioned in the one side region or the other side region of a corresponding one of the given orbits, such that a value of the return-force gain upon positioning of each of said operating members in the one side region of said corresponding orbit is larger than a value of the return-force gain upon positioning of each of said operating members in the other side region of said corresponding orbit,
and wherein the value of the return-force gain of one of said pair of operating members upon positioning of said one of said operating members in the one side region becomes close to the value of the return-force gain of said one of said pair of operating members upon positioning of said one of said operating members in the other side region when the other of said pair of operating members is not being operated.

18. The steering system according to claim 13,
wherein said controlling device is capable of changing at least the return-force gain that is set for each of said pair of operating members,
and wherein the return-force gain set for one of said pair of operating members is made larger when the other of said pair of operating members is not being operated, than when said other of said pair of operating members is being operated.

19. The steering system according to claim 13,
wherein the wheel-turning reference operating position and the return-force reference operating position of each of said pair of operating members are set in the same operating position as a common reference operating position,
said steering system being configured to determine that said other of said pair of operating members is not being operated, when said one of said pair of operating members is operated to be moved from the common reference operating position set for said one of said pair of operating members while said other of said pair of operating members is not operated to be moved from the common reference operating position set for said other of said pair of operating members.

20. The steering system according to claim 1, wherein said controlling device is configured to change at least one of the steering gain and the return-force gain, depending on a running speed of the vehicle.

21. The steering system according to claim 20,
wherein said controlling device is capable of changing at least the steering gain,
and wherein the steering gain is made larger when the running speed of the vehicle is low, than when the running sped of the vehicle is high.

22. The steering system according to claim 20,
wherein said controlling device is capable of changing at least the return-force gain,
and wherein the return-force gain is made smaller when the running speed of the vehicle is low, than when the running sped of the vehicle is high.

23. A steering system for a vehicle, comprising:
a pair of operating members operable independently of each other so as to be movable along given orbits, respectively;
a wheel turning device configured to turn a wheel of the vehicle;
a pair of return-force applying devices each having a power source that is controllable to apply, to a corresponding one of said pair of operating members, a return force as a force for returning said corresponding one of said pair of operating members to a return-force reference operating position that is set for said corresponding one of said pair of operating members;
a controlling device having (a) a wheel-turning control portion which is configured to determine a target wheel-turning amount of the wheel based on an amount of operation of each of said pair of operating members from a wheel-turning reference operating position that is set for said each of said pair of operating members and to control said wheel turning device for equalizing an actual wheel-turning amount of the wheel to the target wheel-turning amount of the wheel, and (b) a return-force control portion which is configured to determine the return force for returning each of said pair operating members, based on an amount of operation of said each of said pair of operating members from the return-force reference operating position that is set for said each of said pair of operating members and to control the power source of each of said pair of return-force applying devices for causing the power source so as to exhibit the return force;
wherein said controlling device is capable of changing at least one of (A) a steering gain that is set for each of said pair of operating members upon determination of the target wheel-turning amount and (B) a return-force gain that is set for each of said pair of operating members upon determination of the return force, such that said at least one of the steering gain and the return-force gain that are set for one of said pair of operating members is changed depending on whether the other of said pair of operating members is being operated or not.

24. The steering system according to claim 23,
wherein said controlling device is capable of changing at least the steering gain that is set for each of said pair of operating members,
and wherein the steering gain set for one of said pair of operating members is made larger when the other of said pair of operating members is not being operated, than when said other of said pair of operating members is being operated.

25. The steering system according to claim 24,
wherein said controlling device is configured to change the steering gain that is set for each of said pair of operating members, depending on an operating position of said each of said pair of operating members,
wherein the steering gain that is set for each of said pair of operating members is changed depending on whether said each of said pair of operating members is positioned in one side region or another side region of a corresponding one of the given orbits, which are close to one and the other of opposite ends of the corresponding orbit, respectively, such that a value of the steering gain upon positioning of each of said operating members in the one side region of said corresponding orbit is smaller than a value of the steering gain upon positioning of each of said operating members in the other side region of said corresponding orbit, and wherein the value of the steering gain of one of said pair of operating members upon positioning of said one of said operating members in the one side region becomes close to the value of the steering gain of said one of said pair of operating members upon positioning of said one of said operating members in the other side region when the other of said pair of operating members is not being operated.

26. The steering system according to claim 23,
wherein said controlling device is capable of changing at least the return-force gain that is set for each of said pair of operating members,
and wherein the return-force gain set for one of said pair of operating members is made smaller when the other of said pair of operating members is not being operated, than when said other of said pair of operating members is being operated.

27. The steering system according to claim 26,
wherein said controlling device is configured to change the return-force gain that is set for each of said pair of operating members, depending on an operating position of said each of said pair of operating members,
wherein the return-force gain that is set for each of said pair of operating members is changed depending on whether said each of said pair of operating members is positioned in one side region or another side region of a corresponding one of the given orbits, which are close to one and the other of opposite ends of the corresponding orbit, respectively, such that a value of the return-force gain upon positioning of each of said operating members in the one side region of said corresponding orbit is larger than a value of the return-force gain upon positioning of each of said operating members in the other side region of said corresponding orbit,
and wherein the value of the return-force gain of one of said pair of operating members upon positioning of said one of said operating members in the one side region becomes close to the value of the return-force gain of said one of said pair of operating members upon positioning of said one of said operating members in the other side region when the other of said pair of operating members is not being operated.

28. The steering system according to claim 23,
wherein said controlling device is capable of changing at least the return-force gain that is set for each of said pair of operating members,
and wherein the return-force gain set for one of said pair of operating members is made larger when the other of said pair of operating members is not being operated, than when said other of said pair of operating members is being operated.

29. The steering system according to claim 23,
wherein the wheel-turning reference operating position and the return-force reference operating position of each of said pair of operating members are set in the same operating position as a common reference operating position,
said steering system being configured to determine that said other of said pair of operating members is not being operated, when said one of said pair of operating members is operated to be moved from the common reference operating position set for said one of said pair of operating members while said other of said pair of operating members is not operated to be moved from the common reference operating position set for said other of said pair of operating members.

30. The steering system according to claim 23, wherein the wheel-turning reference operating position and the return-force reference operating position of each of said pair of operating members are set in the same operating position.

* * * * *